United States Patent
Inagaki et al.

(10) Patent No.: US 11,681,311 B2
(45) Date of Patent: Jun. 20, 2023

(54) CIRCUIT AND METHOD FOR CONTROLLING POWER SUPPLY VOLTAGE BASED ON PREDICTED VOLTAGE DROP

(71) Applicant: CANON KABUSHIKI KAISHA, Tokyo (JP)

(72) Inventors: Mitsuhiro Inagaki, Kanagawa (JP); Koji Aoki, Kanagawa (JP); Eiki Aoyama, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/217,730

(22) Filed: Mar. 30, 2021

(65) Prior Publication Data

US 2021/0311511 A1 Oct. 7, 2021

(30) Foreign Application Priority Data

Apr. 2, 2020 (JP) .............................. JP2020-066957
Feb. 8, 2021 (JP) .............................. JP2021-018097

(51) Int. Cl.
*G05F 1/10* (2006.01)
*G06F 1/26* (2006.01)
*G06F 1/28* (2006.01)
*G06F 1/3206* (2019.01)
*G06F 1/30* (2006.01)
*G06F 1/3287* (2019.01)

(52) U.S. Cl.
CPC .................. *G05F 1/10* (2013.01); *G06F 1/26* (2013.01); *G06F 1/28* (2013.01); *G06F 1/3206* (2013.01); *G06F 1/30* (2013.01); *G06F 1/305* (2013.01); *G06F 1/3287* (2013.01)

(58) Field of Classification Search
CPC ........ G06F 1/26; G06F 1/3287; G06F 1/3206; G06F 1/28; G06F 1/30; G06F 1/305; G06F 1/10
USPC .................................. 713/300, 320, 324, 340
See application file for complete search history.

(56) References Cited

U.S. PATENT DOCUMENTS

| | | | |
|---|---|---|---|
| 9,229,506 B1* | 1/2016 | Holzman | G06F 1/324 |
| 9,753,525 B2* | 9/2017 | Haider | G06F 1/3243 |
| 2016/0291625 A1* | 10/2016 | Tripathi | G06F 1/3296 |
| 2017/0344102 A1* | 11/2017 | Kolla | G06F 1/3296 |
| 2018/0067541 A1* | 3/2018 | Chuang | G06F 1/305 |
| 2019/0041942 A1* | 2/2019 | Keceli | G06F 1/3206 |
| 2019/0310698 A1* | 10/2019 | Mehra | G06F 1/305 |
| 2019/0377405 A1* | 12/2019 | Uan-Zo-li | G06F 1/3296 |
| 2020/0408832 A1* | 12/2020 | Hovis | G01R 31/2851 |

FOREIGN PATENT DOCUMENTS

| | | |
|---|---|---|
| JP | 2013135101 A | 7/2013 |
| JP | 6232726 B2 | 11/2017 |

* cited by examiner

*Primary Examiner* — Ji H Bae
(74) *Attorney, Agent, or Firm* — Canon U.S.A., Inc. IP Division

(57) ABSTRACT

A semiconductor integrated circuit includes a first circuit connected to a power supply line, a determination portion configured to determine whether a voltage drop in the power supply line affects an operation of the first circuit, and a power supply voltage control portion configured to control change of a power supply voltage value on the basis of a determination result of the determination portion.

21 Claims, 18 Drawing Sheets

FIG. 2

INTERNAL DATA TABLE IN PREDICTION CIRCUIT 112

| TYPE OF SECOND CIRCUIT | VOLTAGE DROP AMOUNT | VOLTAGE DROP START TIME | VOLTAGE DROP END TIME |
|---|---|---|---|
| SECOND CIRCUIT A | 0.04V | AFTER 200 μs | AFTER 400 μs |
| SECOND CIRCUIT B | 0.05V | AFTER 300 μs | AFTER 600 μs |
| SECOND CIRCUIT C | 0.30V | AFTER 300 μs | AFTER 500 μs |
| SECOND CIRCUIT D | 0.70V | AFTER 200 μs | AFTER 600 μs |

FIG. 3

INTERNAL DATA TABLE IN IMPACT DETERMINATION CIRCUIT 113

| OPERATION MODE | IS FIRST CIRCUIT IN OPERATING STATE? |
|---|---|
| HIGH IMAGE QUALITY MODE | Yes |
| MEDIUM IMAGE QUALITY MODE | Yes |
| LOW IMAGE QUALITY MODE | No |

FIG. 8

INTERNAL DATA TABLE IN IMPACT DETERMINATION CIRCUIT B703

| OPERATION MODE | IS FIRST CIRCUIT IN OPERATING STATE? | IS THIRD CIRCUIT (REDUNDANT CIRCUIT) IN OPERATING STATE? |
|---|---|---|
| HIGH RESOLUTION MODE | Yes | Yes |
| LOW RESOLUTION MODE A | Yes | No |
| LOW RESOLUTION MODE B | No | Yes |

FIG. 11

INTERNAL DATA TABLE IN IMPACT DETERMINATION CIRCUIT C1003

| OPERATING FREQUENCY OF FIRST CIRCUIT | PROCESS CORNER OF SYSTEM LSI | TEMPERATURE OF FIRST CIRCUIT | MINIMUM OPERATING VOLTAGE OF FIRST CIRCUIT |
|---|---|---|---|
| 500MHz | Fast | 80°C | 1.14V |
| 500MHz | Typical | 80°C | 1.17V |
| 500MHz | Slow | 80°C | 1.20V |
| 50MHz | Fast | 60°C | 0.87V |
| 50MHz | Typical | 60°C | 0.90V |
| 50MHz | Slow | 60°C | 0.93V |

FIG. 14

| | OPERATING STATES OF FUCTIONS IN OPERATION MODES | | | | |
|---|---|---|---|---|---|
| | A | B | C | D | E |
| OPERATION MODE 1 | OPERATING | NON-OPERATING | NON-OPERATING | OPERATING | OPERATING |
| OPERATION MODE 2 | OPERATING | OPERATING | OPERATING | OPERATING | OPERATING |
| OPERATION MODE 3 | OPERATING | OPERATING | NON-OPERATING | NON-OPERATING | NON-OPERATING |
| OPERATION MODE 4 | NON-OPERATING | OPERATING | OPERATING | NON-OPERATING | NON-OPERATING |

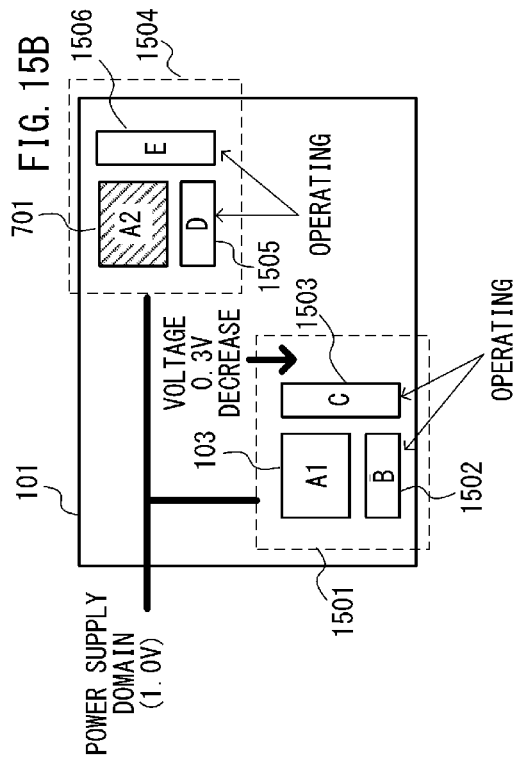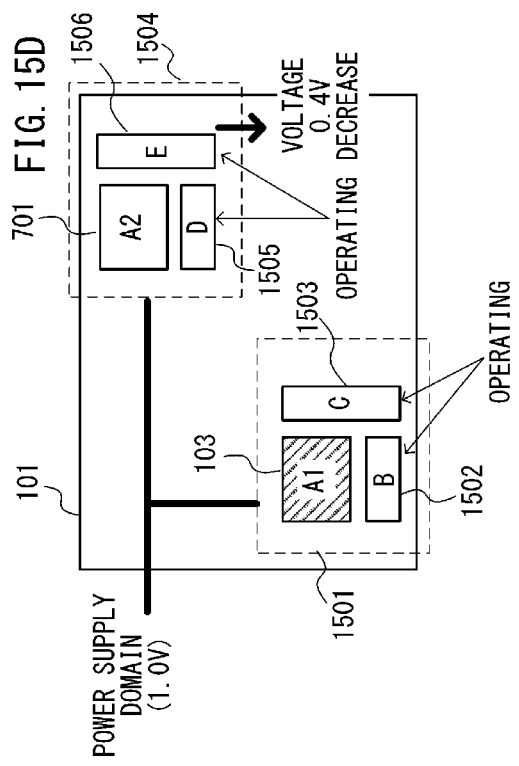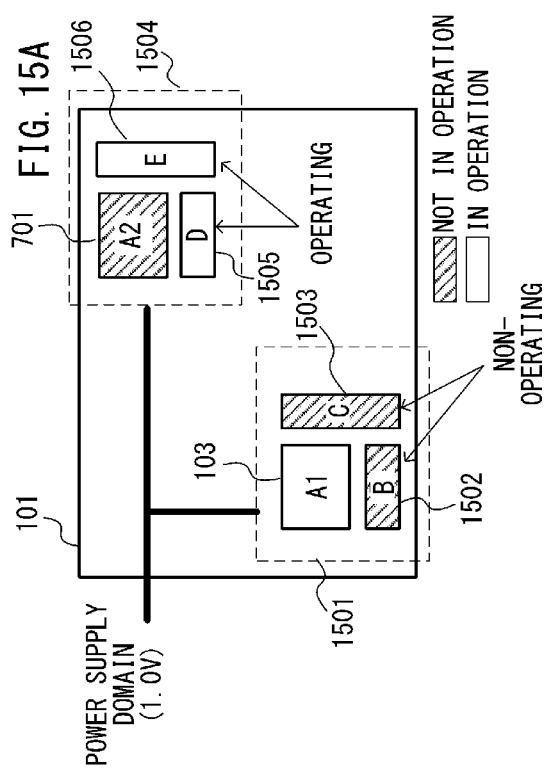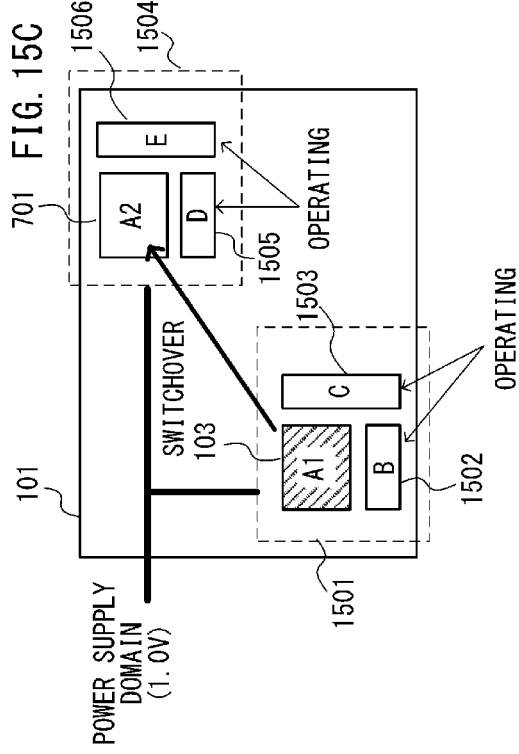

POWER SUPPLY VOLTAGE PREDICTION TABLE FOR AREA 1501

POWER SUPPLY VOLTAGE PREDICTION TABLE FOR AREA 1504

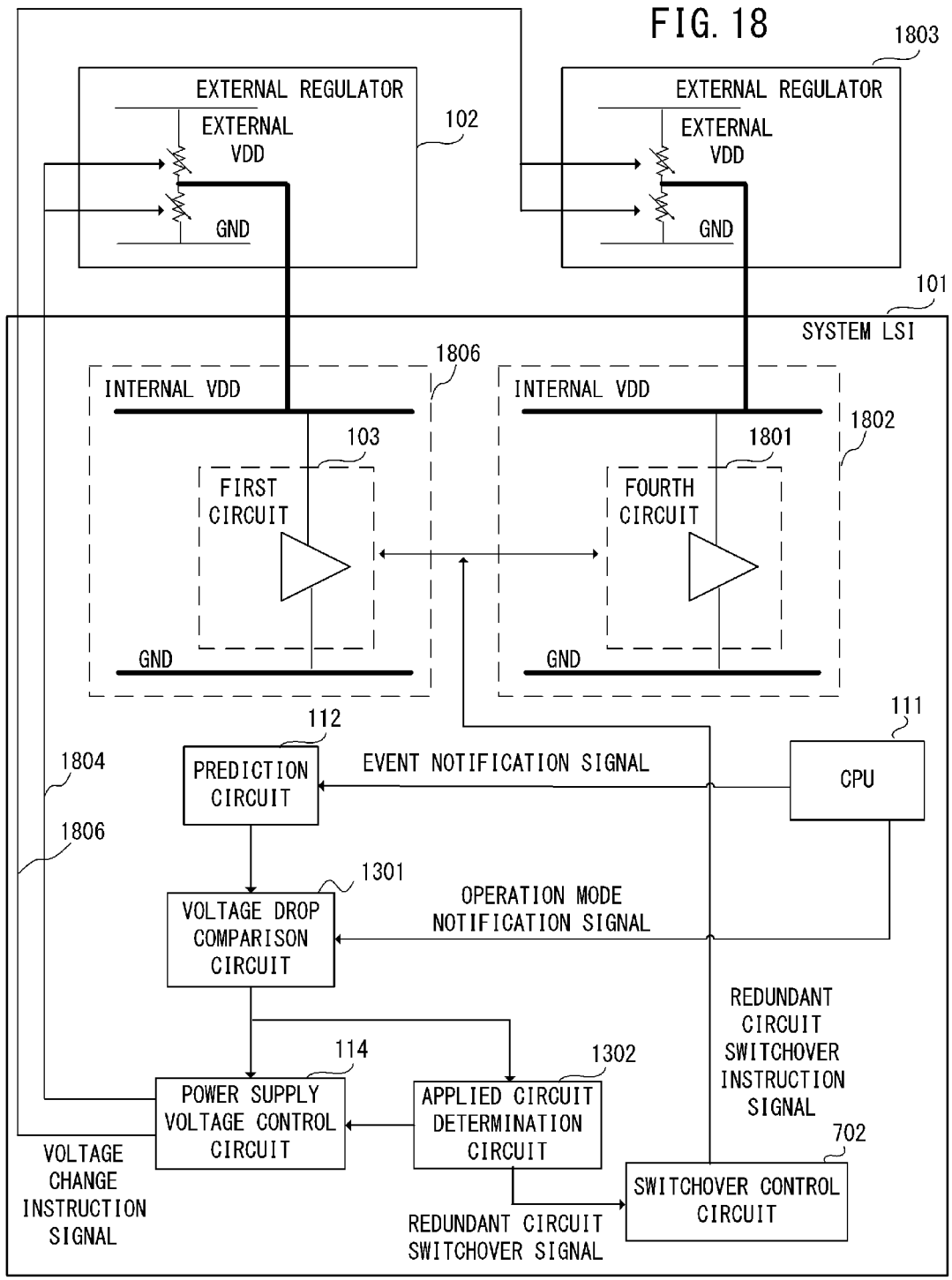

CIRCUIT AND METHOD FOR CONTROLLING POWER SUPPLY VOLTAGE BASED ON PREDICTED VOLTAGE DROP

BACKGROUND

Field of the Disclosure

The present disclosure relates to a semiconductor integrated circuit and a power supply volage control method.

Description of the Related Art

Recent years have seen miniaturization in semiconductor integrated circuit manufacturing processes and reduction in driving power supply voltage. This trend has caused an issue of a drop in power supply voltage, which is called an IR drop, due to a power supply noise or the like. To reduce the impact of the power supply voltage drop, namely, the IR drop, on an operation of a semiconductor integrated circuit, there have been disclosed techniques for increasing the power supply voltage up to a rated voltage during a voltage drop.

For instance, Japanese Patent No. 6232726 discloses that a power supply voltage is increased up to a rated voltage during a voltage drop, by adjusting the control pulse of the power supply voltage and the amount of current supply so as to cancel the voltage drop.

Regarding the technique for increasing the power supply voltage up to a rated voltage during a voltage drop, Japanese Patent Application Publication No. 2013-135101 discloses that voltage correction is performed based on a voltage history, since there are cases where voltage correction is insufficient when the voltage is controlled based on an instantaneous voltage drop.

SUMMARY

According to the first aspect of the present disclosure, it is provided a semiconductor integrated circuit including a first circuit connected to a power supply line, a determination portion configured to determine whether a voltage drop in the power supply line affects an operation of the first circuit, and a power supply voltage control portion configured to control change of a power supply voltage value on the basis of a determination result of the determination portion.

According to the second aspect of the present disclosure, it is provided a power supply voltage control method for a semiconductor integrated circuit including a first circuit connected to a power supply line, the power supply voltage control method including determining whether a voltage drop in the power supply line affects an operation of the first circuit, and controlling change of a power supply voltage value based on a determination by the determining.

Further features of the present invention will become apparent from the following description of exemplary embodiments with reference to the attached drawings.

BRIEF DESCRIPTION OF THE DRAWINGS

FIG. 2 illustrates an example of a data table in a prediction circuit 112 according to Embodiment 1;

FIG. 3 illustrates an example of a data table in an impact determination circuit 113 according to Embodiment 1;

FIG. 8 illustrates an example of a data table in an impact determination circuit B703 according to Embodiment 2;

FIG. 11 illustrates an example of a data table in an impact determination circuit C1003 according to Embodiment 3;

FIG. 14 illustrates operation modes according to Embodiment 4;

FIGS. 15A to 15D each illustrates a state of each operation mode according to Embodiment 4;

FIG. 18 illustrates a configuration example of a semiconductor integrated circuit employing a plurality of power supply domains.

DESCRIPTION OF THE EMBODIMENTS

In Japanese Patent No. 6232726 and Japanese Patent Application Publication No. 2013-135101, an impact of a power supply voltage drop on an operation of a semiconductor integrated circuit can be reduced by detecting occurrence of the power supply voltage drop due to an IR drop and increasing the power supply voltage up to a rated voltage during the voltage drop.

However, if the correction of the power supply voltage is performed every time a voltage drop occurs, even in a case where the voltage drop does not affect a circuit operation without performing a correction, the correction is still performed. Consequently, unnecessary power consumption occurs for performing the voltage correction.

The present disclosure provides a technique for reducing unnecessary power supply voltage correction at the time of voltage drop so that the power consumption can be reduced.

Hereinafter, a semiconductor integrated circuit including a power supply voltage correction apparatus according to the embodiments of the present disclosure will be described in detail with reference to the drawings. The following embodiments are merely examples and are not intended to limit the scope of the present disclosure.

Embodiment 1

Configuration Example of Apparatus

Figure 1:
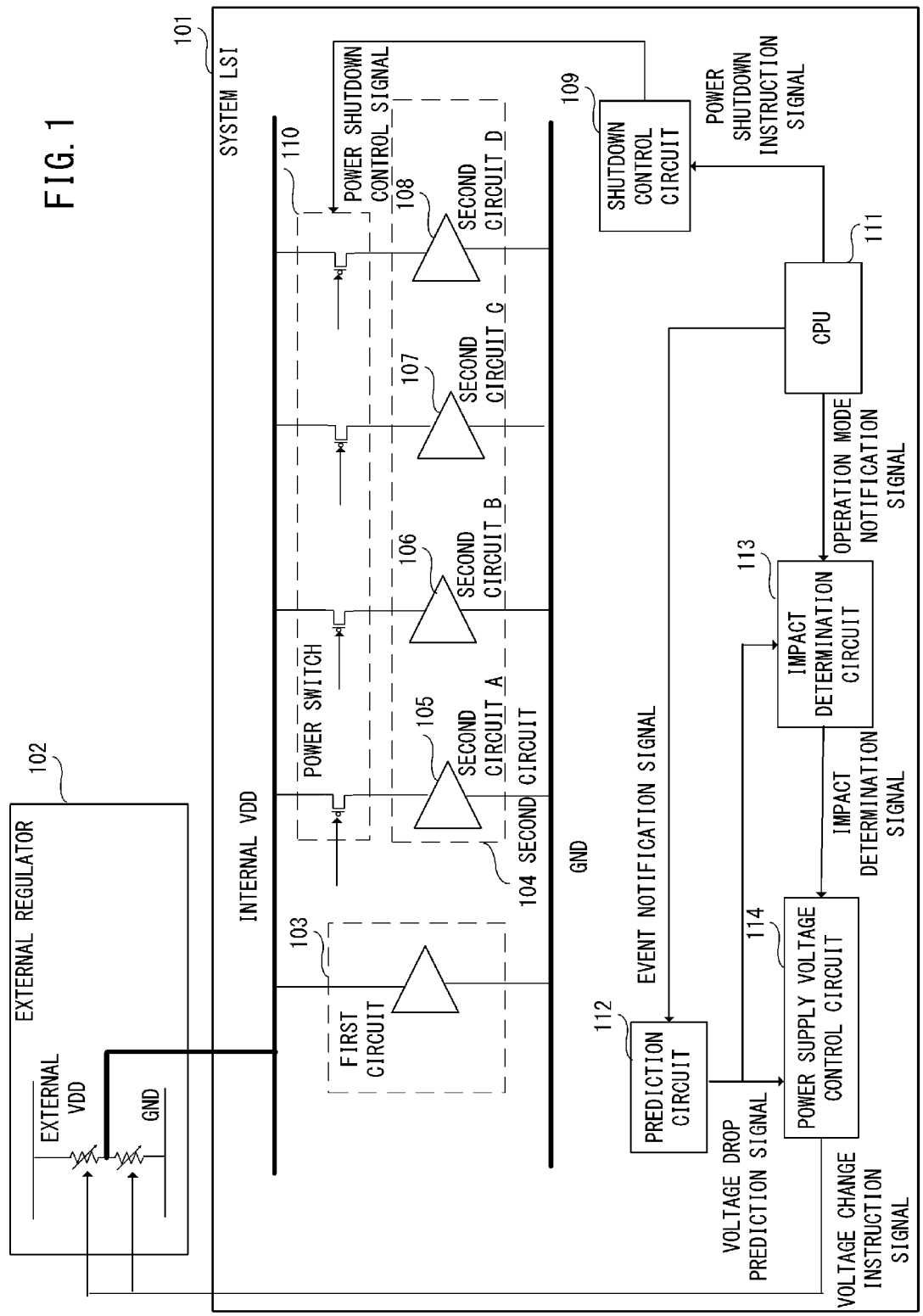
FIG. 1 illustrates a configuration example of a semiconductor integrated circuit according to Embodiment 1.

FIG. 1 illustrates a configuration example of a semiconductor integrated circuit according to Embodiment 1. The semiconductor integrated circuit in FIG. 1 includes a system LSI 101 and an external voltage regulator 102.

The external voltage regulator 102 generates internal VDD which is a power supply voltage supplied to the system LSI 101, based on a power supply voltage supplied from an external power supply not illustrated and GND which is a ground potential, and supplies the generated internal VDD to the system LSI 101. The internal VDD has a lower voltage value than the external VDD. In the present embodiment, the external VDD is 5.00 V, and the internal VDD is 1.30 V. Likewise, VSS, which is the ground potential, is 0.00 V, and VSS is supplied to both of the system LSI 101 and the external voltage regulator 102. As illustrated in FIG. 1, the external voltage regulator 102 generates the internal VDD from the external VDD by using a voltage dividing resistor and changes the voltage value of the internal VDD based on a voltage change instruction signal received from a power supply voltage control circuit 114.

Next, each constituent element of the system LSI 101 will be described.

The system LSI 101 includes a first circuit 103, a second circuit 104, a shutdown control circuit 109, a power switch 110, a CPU 111, a prediction circuit 112, an impact determination circuit 113, and the power supply voltage control circuit 114.

The first circuit 103 is a circuit in which a voltage drop due to an IR drop occurs. The first circuit 103 may also be referred to as a voltage drop occurrence target circuit. A positive power supply terminal of the first circuit 103 is connected to a power supply line through which the internal VDD is supplied, a negative power supply terminal of the first circuit 103 is connected to a ground line through which the ground potential GND is supplied, and a voltage drop of the internal VDD occurs due to the IR drop.

The second circuit 104 is a circuit to be a power shutdown target. The second circuit 104 may also be referred to as a power shutdown circuit. The second circuit 104 is connected to the internal VDD for the power supply voltage and to the GND for the ground potential.

The power switch 110 is connected between the internal VDD and the second circuit 104. In accordance with an ON/OFF state of the power switch 110, which will be described below, the power shutdown of the second circuit 104 is controlled. When the power switch 110 is set to ON, the state of the second circuit 104 changes from a power shutdown state to an energized state, and the power is restored. This generates an inrush current from the internal VDD to the GND. As a result, a voltage drop due to the IR drop occurs in the first circuit 103 sharing the internal VDD as the power supply voltage.

The second circuit 104 is provided in plurality. In the present embodiment, the second circuit 104 includes four circuits: a second circuit A105, a second circuit B106, a second circuit C107, and a second circuit D108. The power switch 110 individually controls the power supplies to these four circuits based on an instruction from the shutdown control circuit 109. The amount of voltage drop that occurs in the first circuit 103 varies depending on the second circuit 104 to which power is restored, which will be described in detail below.

When a power shutdown instruction signal from the CPU 111 is ON, the shutdown control circuit 109 sets a power shutdown control signal to the power switch 110 to OFF. When the power shutdown instruction signal is OFF, the shutdown control circuit 109 sets the power shutdown control signal to the power switch 110 to ON. The power shutdown control signal is a signal that controls ON and OFF of the power switch 110. When the power shutdown control signal is ON, the power switch 110 is set to ON, and when the power shutdown control signal is OFF, the power switch 110 is set to OFF.

The power switch 110 is connected between the internal VDD and the second circuit 104 and shuts down the power supply to the second circuit 104 based on the state of the power shutdown control signal from the shutdown control circuit 109. When the power shutdown control signal is set to ON, the power switch 110 is brought into the ON state, and this brings the second circuit 104 into an energized state. When the power shutdown control signal is set to OFF, the power switch 110 is brought into the OFF state, and this brings the second circuit 104 into a power shutdown state.

The CPU 111 is a central processing unit and controls power shutdown processing and power supply restoration processing on the second circuit 104 in the present embodiment. The CPU 111 corresponds to instruction portion configured to transmit an instruction signal that instructs to shut down or restore the power supply to the second circuit 104 to the shutdown control circuit 109. In addition, when transmitting the instruction signal that instructs to restore the power supply, the CPU 111 also transmits an event notification signal about occurrence of a voltage drop and an operation mode notification signal, which will be described below. These signals may be transmitted by an ASIC or an FPGA in place of the CPU.

The CPU 111 changes the power shutdown instruction signal transmitted to the shutdown control circuit 109 from ON to OFF at a timing when the power supply to the second circuit 104 is restored. The power shutdown instruction signal is a signal that instructs the shutdown control circuit 109 to shut down the power supply to the second circuit 104. When the power shutdown instruction signal is ON, the second circuit 104 is brought into the power shutdown state, and when the power shutdown instruction signal is OFF, the second circuit 104 is brought into the energized state. The power shutdown instruction signal individually instructs the second circuit A105, the second circuit B106, the second circuit C107, and the second circuit D108 to shut down the power supply. In the present embodiment, it is assumed that the power shutdown control operation is individually performed on these four circuits one by one and is not simultaneously performed on a plurality of circuits.

The CPU 111 transmits an event notification signal (a first notification signal) that indicates occurrence of a voltage drop to the prediction circuit 112 at the same timing as when the CPU 111 transmits the power shutdown instruction signal to the shutdown control circuit 109. The event notification signal is a signal that gives notice of occurrence of a voltage drop in the first circuit 103. The event notification signal includes information indicating, among the plurality of second circuits 104, the circuit to which power is restored, in other words, information about the type of second circuit 104 which has caused the voltage drop with the power supply restoration processing. In the present embodiment, the information about the type of second circuit 104 represents a value of any one of "the second circuit A105", "the second circuit B106", "the second circuit C107", and "the second circuit D108".

The CPU 111 transmits an operation mode notification signal (a second notification signal) to the impact determination circuit 113 at the same timing as when the CPU 111 transmits the power shutdown instruction signal to the shutdown control circuit 109. The operation mode notification signal is a signal that notifies an operation mode of the first circuit 103 and includes information about the operation mode of the first circuit 103. In the present embodiment, the information about the operation mode represents a value of a "high image quality mode", a "medium image quality mode", or a "low image quality mode".

The prediction circuit 112 predicts whether a voltage drop of the internal VDD occurs. More specifically, the prediction circuit 112 predicts a voltage drop amount (a voltage drop value), a voltage drop start time, and a voltage drop end time of the first circuit 103 due to the IR drop. In response to receiving the event notification signal (the first notification signal) from the CPU 111, the prediction circuit 112 refers to a data table in the prediction circuit 112. By referring to the data table, the prediction circuit 112 can predict the voltage drop amount, the voltage drop start time, and the voltage drop end time that correspond to the information included in the event notification signal and indicating the type of second circuit 104 to which power is restored. The prediction circuit 112 transmits a voltage drop prediction signal including the above information to the power supply voltage control circuit 114 and to the impact determination circuit 113. In the present embodiment, the prediction circuit 112 predicts three items of information, namely, the voltage drop amount, the voltage drop start time, and the voltage drop end time. However, the prediction circuit 112 may predict at least one of these items of information.

FIG. 2 illustrates an example of the data table included in the prediction circuit 112 of the present embodiment. The data table stores information about a voltage drop amount, a voltage drop start time, and a voltage drop end time that are associated with power shutdown restoration of each of the second circuits 104. The prediction circuit 112 refers to this internal data table and predicts a voltage drop amount, a voltage drop start time, and a voltage drop end time that are associated with power shutdown restoration of each of the second circuits 104. For example, in a case of the power supply restoration of the second circuit D108, the prediction circuit 112 predicts that the voltage drop amount is 0.70 V, the voltage drop start time is after 200 μs, the voltage drop end time is after 600 μs.

In the present embodiment, the prediction circuit 112 predicts the voltage drop amount. However, a voltage monitoring circuit that measures a current value of the power supply voltage may be used in place of the prediction circuit 112. The voltage monitoring circuit monitors changes in power supply voltage and transmits a signal indicating that a voltage drop has been detected to the impact determination circuit 113. In response to receiving the signal, the impact determination circuit 113 determines whether the voltage drop affects the operation of the first circuit 103. In addition, the voltage monitoring circuit may monitor and record the changes in power supply voltage, predict a voltage drop amount and a voltage drop end time from the history of the power supply voltage, and notify the impact determination circuit 113 of these predicted values. The voltage monitoring circuit is regarded as voltage monitoring portion configured to monitor changes in power supply voltage.

Further, the prediction circuit 112 and the above voltage monitoring circuit may be used in combination to control the voltage based on both the predicted voltage drop amount and the current value of the power supply voltage.

When a voltage drop is predicted to occur, the impact determination circuit 113 determines whether this voltage drop affects the circuit operation of the first circuit 103. In the present embodiment, if the first circuit 103 is in an operating state during a period in which a voltage drop is predicted to occur, the impact determination circuit 113 determines that the voltage drop affects the circuit operation, and if the first circuit 103 is in a non-operating state, the impact determination circuit 113 determines that the voltage drop does not affect the circuit operation. In the present embodiment, after the impact determination circuit 113 receives a voltage drop prediction signal from the prediction circuit 112, in response to receiving an operation mode notification signal from the CPU 111, the impact determination circuit 113 determines whether the first circuit 103 is in the operating state. Whether the first circuit 103 is in the operating state in the current operation mode can be determined by referring to the data table. When the first circuit 103 is in the operating state, the impact determination circuit 113 sets an impact determination signal to ON, and when the first circuit 103 is in the non-operating state, the impact determination circuit 113 sets the impact determination signal to OFF. The impact determination signal is a signal indicating whether the voltage drop due to the IR drop affects the circuit operation of the first circuit 103. When the impact determination signal is ON, the voltage drop affects the circuit operation of the first circuit 103, and when the impact determination signal is OFF, the voltage drop does not affect the circuit operation of the first circuit 103. The impact determination circuit 113 transmits the impact determination signal to the power supply voltage control circuit 114.

In the present embodiment, it is assumed that, after the voltage drop prediction signal is received from the prediction circuit 112, the operation mode of the first circuit 103 does not change during the actual period from the start to the end of the voltage drop in the first circuit 103. Thus, in the present embodiment, the impact determination signal is controlled based only on the operation mode of the first circuit 103 at the current time. However, for example, based on the information about the voltage drop start time and the voltage drop end time, the impact determination signal may be controlled by actually predicting the state of the operation mode during the period from the start to the end of the voltage drop in the first circuit 103.

FIG. 3 illustrates an example of a data table included in the impact determination circuit 113 of the present embodiment. The data table stores a relationship between an operation mode of the first circuit 103 of the present embodiment and whether the first circuit 103 is in the operating state when in each operation mode. The first circuit 103 in the present embodiment has a high image quality mode, a medium image quality mode, and a low image quality mode. In the example in FIG. 3, the first circuit 103 operates in the high image quality mode and the medium image quality mode but not in the low image quality mode.

The impact determination circuit 113 determines whether the first circuit 103 is in the operating state by referring to this internal data table. For example, when the first circuit 103 is in the low image quality mode, the impact determination circuit 113 determines that the first circuit 103 does not operate based on the data table in FIG. 3.

Based on the determination result of the impact determination circuit 113, the power supply voltage control circuit 114 transmits a voltage change instruction signal to the external voltage regulator 102 to change the voltage value (the power supply voltage value) of the internal VDD. The voltage change instruction signal is a control signal for changing the voltage value of the internal VDD to a specified volage value only for a specified period of time. After the power supply voltage control circuit 114 receives the voltage drop prediction signal from the prediction circuit 112, the power supply voltage control circuit 114 controls whether to transmit the voltage change instruction signal to the external voltage regulator 102 based on the value of the impact determination signal received from the impact determination circuit 113.

Specifically, when the impact determination signal is ON, the power supply voltage control circuit 114 transmits the voltage change instruction signal so as to increase the voltage value of the internal VDD by the voltage drop amount during a period from the voltage drop start time to the voltage drop end time included in the voltage drop prediction signal. In contrast, when the impact determination signal is OFF, the power supply voltage control circuit 114 does not transmit the voltage change instruction signal so as not to perform the control operation to change the voltage value of the internal VDD.

Hereinafter, flowcharts illustrating the respective circuit operations of the present embodiment will be described.

Operation Flowchart of Prediction Circuit 112

Figure 4:
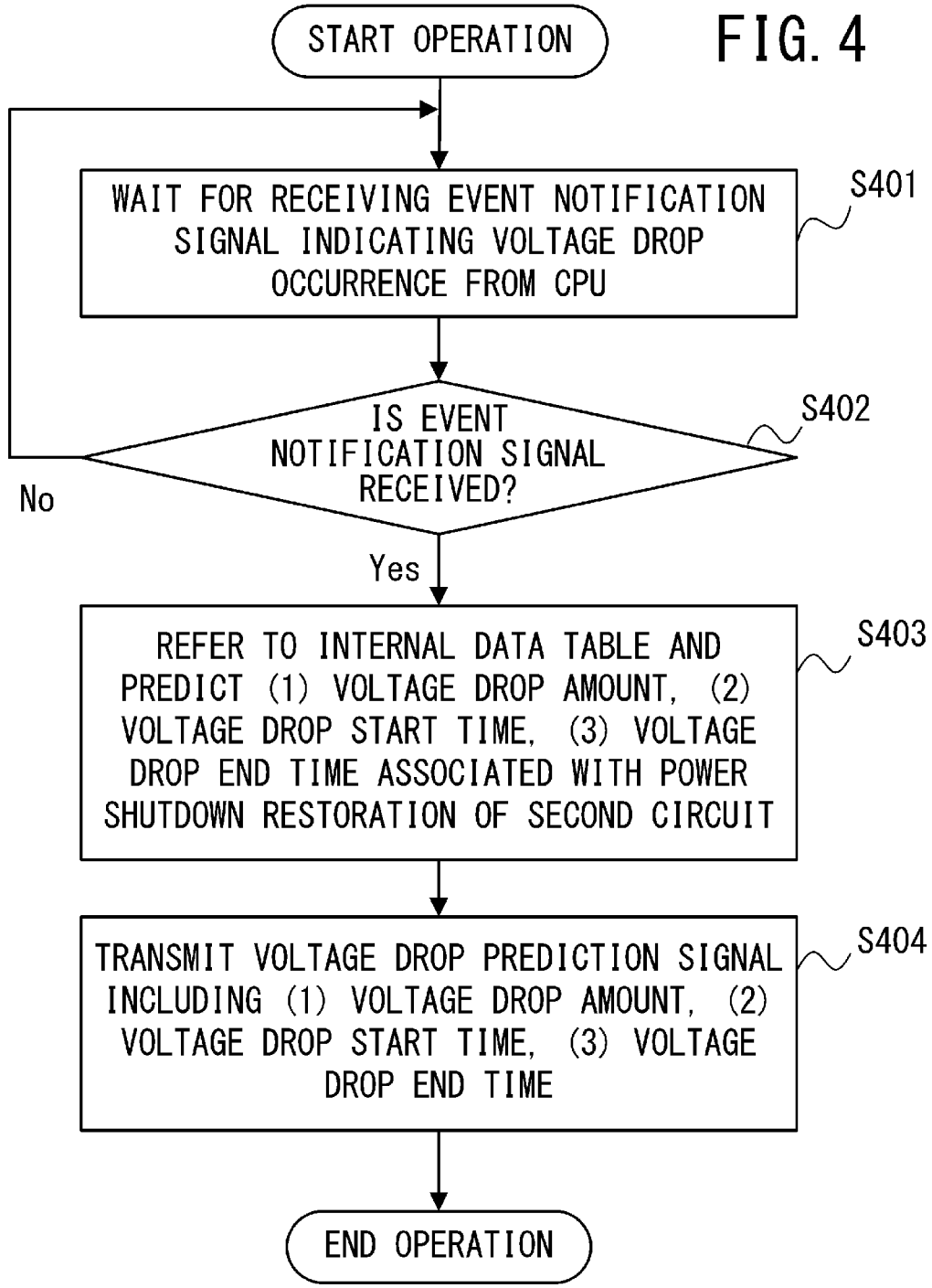
FIG. 4 is a flowchart illustrating an operation of the prediction circuit 112 according to Embodiment 1.

FIG. 4 is a flowchart illustrating an operation of the prediction circuit 112 of the present embodiment.

First, the prediction circuit 112 waits for receiving an event notification signal indicating occurrence of a voltage drop from the CPU 111 (S401) and determines whether the event notification signal is received from the CPU 111 (S402). If the event notification signal is not received (No in S402), the processing returns to step S401. If the event notification signal is received (Yes in S402), the processing proceeds to step S403.

Next, the prediction circuit 112 refers to the internal data table and predicts a voltage drop amount, a voltage drop start time, and a voltage drop end time that are associated with the power shutdown restoration of each of the second circuits 104 (S403). Next, the prediction circuit 112 transmits a voltage drop prediction signal including information about the voltage drop amount, the voltage drop start time, and the voltage drop end time to the power supply voltage control circuit 114 and to the impact determination circuit 113 (S404).

Operation Flowchart of Impact Determination Circuit 113

Figure 5:
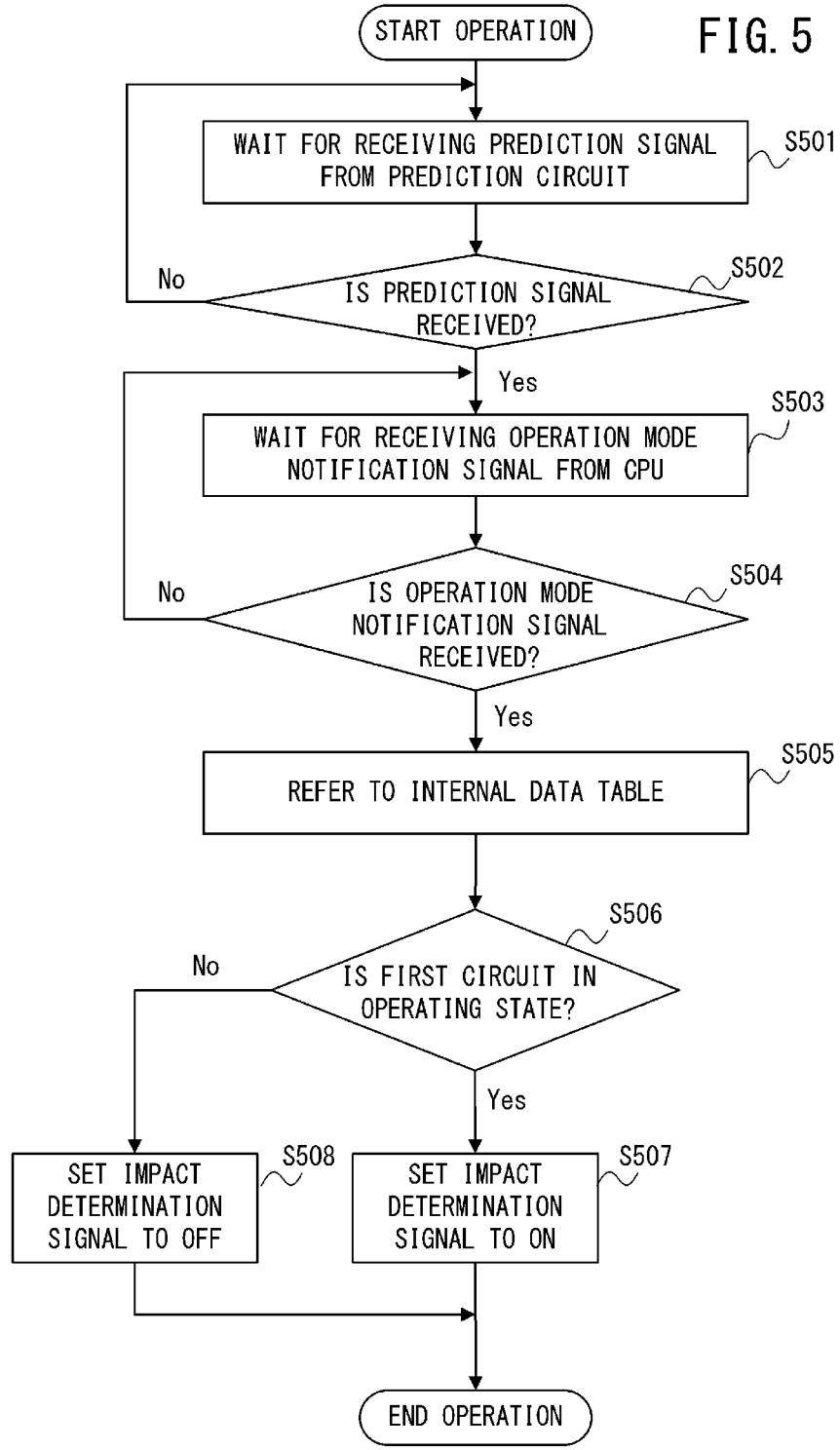
FIG. 5 is a flowchart illustrating an operation of the impact determination circuit 113 according to Embodiment 1.

FIG. 5 is a flowchart illustrating an operation of the impact determination circuit 113 of the present embodiment.

First, the impact determination circuit 113 is in a waiting state for receiving a voltage drop prediction signal from the prediction circuit 112 (S501) and determines whether the voltage drop prediction signal is received from the prediction circuit 112 (S502). If the voltage drop prediction signal is not received (No in S502), the processing returns to step S501. If the voltage drop prediction signal is received (Yes in S502), the processing proceeds to step S503.

Next, the impact determination circuit 113 is in a waiting state for receiving an operation mode notification signal from the CPU 111 (S503) and determines whether the operation mode notification signal is received from the CPU 111 (S504). If the operation mode notification signal is not received (No in S504), the processing returns to S503. If the operation mode notification signal is received (Yes in S504), the processing proceeds to step S505.

Next, the impact determination circuit 113 refers to the internal data table in FIG. 3 (S505) and determines whether the first circuit 103 is in an operating state (S506). If the first circuit 103 is determined to be in the operating state in step S506 (Yes in S506), the processing proceeds to step S507, and the impact determination circuit 113 sets an impact determination signal to ON. If the first circuit 103 is determined to be not in the operating state in step S506 (No in S506), the processing proceeds to step S508, and the impact determination circuit 113 sets the impact determination signal to OFF.

Operation Flowchart of Power Supply Voltage Control Circuit 114

Figure 6:
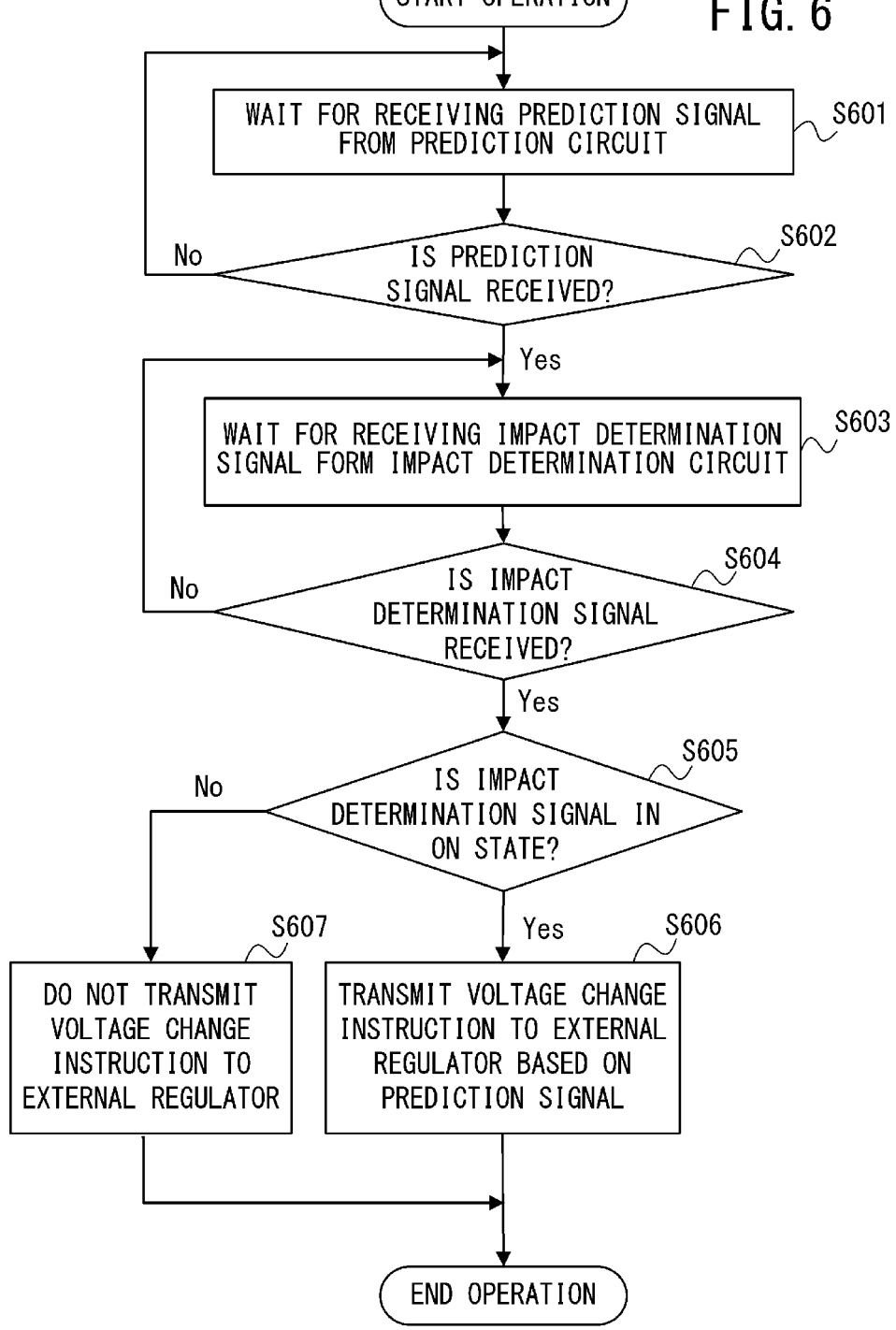
FIG. 6 is a flowchart illustrating an operation of a power supply voltage control circuit 114 according to Embodiment 1.

FIG. 6 is a flowchart illustrating an operation of the power supply voltage control circuit 114 of the present embodiment.

First, the power supply voltage control circuit 114 is in a waiting state for receiving a voltage drop prediction signal from the prediction circuit 112 (S601) and determines whether the voltage drop prediction signal is received from the prediction circuit 112 (S602). If the voltage drop prediction signal is not received (No in S602), the processing returns to step S601. If the voltage drop prediction signal is received (Yes in S602), the processing proceeds to step S603.

Next, the power supply voltage control circuit 114 is in a waiting state for receiving an impact determination signal from the impact determination circuit 113 (S603) and determines whether the impact determination signal is received from the impact determination circuit 113 (S604). If the impact determination signal is not received (No in S604), the processing returns to S603. If the impact determination signal is received (Yes in S604), the processing proceeds to step S605.

The power supply voltage control circuit 114 determines whether the impact determination signal is in an ON state (S605). If the impact determination signal is in the ON state (Yes in S605), the processing proceeds to step S606, and the power supply voltage control circuit 114 transmits a voltage change instruction signal to the external voltage regulator 102 based on the voltage drop prediction signal values. That is, the power supply voltage control circuit 114 transmits, to the external voltage regulator 102, a voltage change instruction signal that instructs to increase the internal VDD during a period from the voltage drop start time to the voltage drop end time indicated by the voltage drop prediction signal, by the voltage drop amount also indicated in this signal. If the impact determination signal is in an OFF state (No in S605), the processing proceeds to step S607, and the power supply voltage control circuit 114 does not transmit the voltage change instruction signal to the external voltage regulator 102.

Operation Examples and Advantageous Effects

Specific operation examples and advantageous effects according to the present embodiment will be described by using respective cases where the first circuit 103 is in a high image quality mode and the first circuit 103 is in a low image quality mode.

First, a case where the power supply to the second circuit D108 is restored will be described. The CPU 111 transmits a power shutdown instruction signal that instructs to bring the second circuit D108 into an energized state to shutdown control circuit 109. At the same time, the CPU 111 transmits an event notification that indicates occurrence of a voltage drop to the prediction circuit 112 and also transmits an operation mode notification signal to the impact determination circuit 113.

The prediction circuit 112 makes a prediction on a voltage drop in the first circuit 103 based on the operation flowchart in FIG. 4 and the contents of the data table in FIG. 2. In this example, the prediction circuit 112 predicts that a voltage drop of 0.70 V will occur in the first circuit 103 in a period between after 200 µs and after 600 µs. The prediction circuit 112 transmits a voltage drop prediction signal including these items of information to the impact determination circuit 113 and to the power supply voltage control circuit 114.

The impact determination circuit 113 determines whether the first circuit 103 is in an operating state at the time of the occurrence of the voltage drop based on the operation flowchart in FIG. 5 and the contents of the data table in FIG. 3. If the current mode is a high image quality mode, the first circuit 103 is determined to be in the operating state, and if the current mode is a low image quality mode, the first circuit 103 is determined to be not in the operating state.

Based on the operation flowchart in FIG. 6, the power supply voltage control circuit 114 operates as follows. In the case of the high image quality mode, the power supply voltage control circuit 114 transmits a voltage change instruction signal to the external voltage regulator 102. The power supply voltage control circuit 114 transmits, to the external voltage regulator 102, the voltage change instruction signal that instructs to change the power supply voltage value so as to maintain a rated voltage value of 1.30 V against a voltage drop of 0.70 V in the internal VDD. The voltage change instruction signal is transmitted during a period in which the voltage drop is occurring, that is, from after 200 us to after 600 μs. In this way, the voltage value of the internal VDD is controlled to maintain the rated voltage value of 1.30 V.

In contrast, in the case of the low image quality mode, the power supply voltage control circuit 114 does not transmit the voltage change instruction signal to the external voltage regulator 102. Thus, the voltage correction of the internal VDD is not performed in this case.

As described above, according to the present embodiment, if the power supply voltage drop due to the IR drop occurs while the first circuit 103 is operating, the voltage correction is performed so that voltage fluctuation can be reduced to within the guaranteed operational voltage of the first circuit 103. In contrast, if the first circuit 103 is not operating, the voltage correction is not performed so that unnecessary voltage increase can be reduced. This enables power reduction. That is, according to the present embodiment, whether or not the voltage correction is needed is determined, and the voltage correction is performed only when needed. This enables both the continued normal operation and power saving.

Embodiment 2

Configuration Example of Apparatus

A configuration of the present embodiment differs only partly from that of Embodiment 1. Therefore, descriptions of the same constituent elements will be omitted, and different elements will mainly be described in detail.

In the present embodiment, in a case where a voltage drop is expected to occur while a first circuit 103 is operating, if a third circuit (a redundant circuit) 701, which will be described below, is unused, switching is performed so that the third circuit 701 can perform the processing of the first circuit 103, and the first circuit 103 is changed into an unused state. Thus, voltage correction is not performed.

Figure 7:
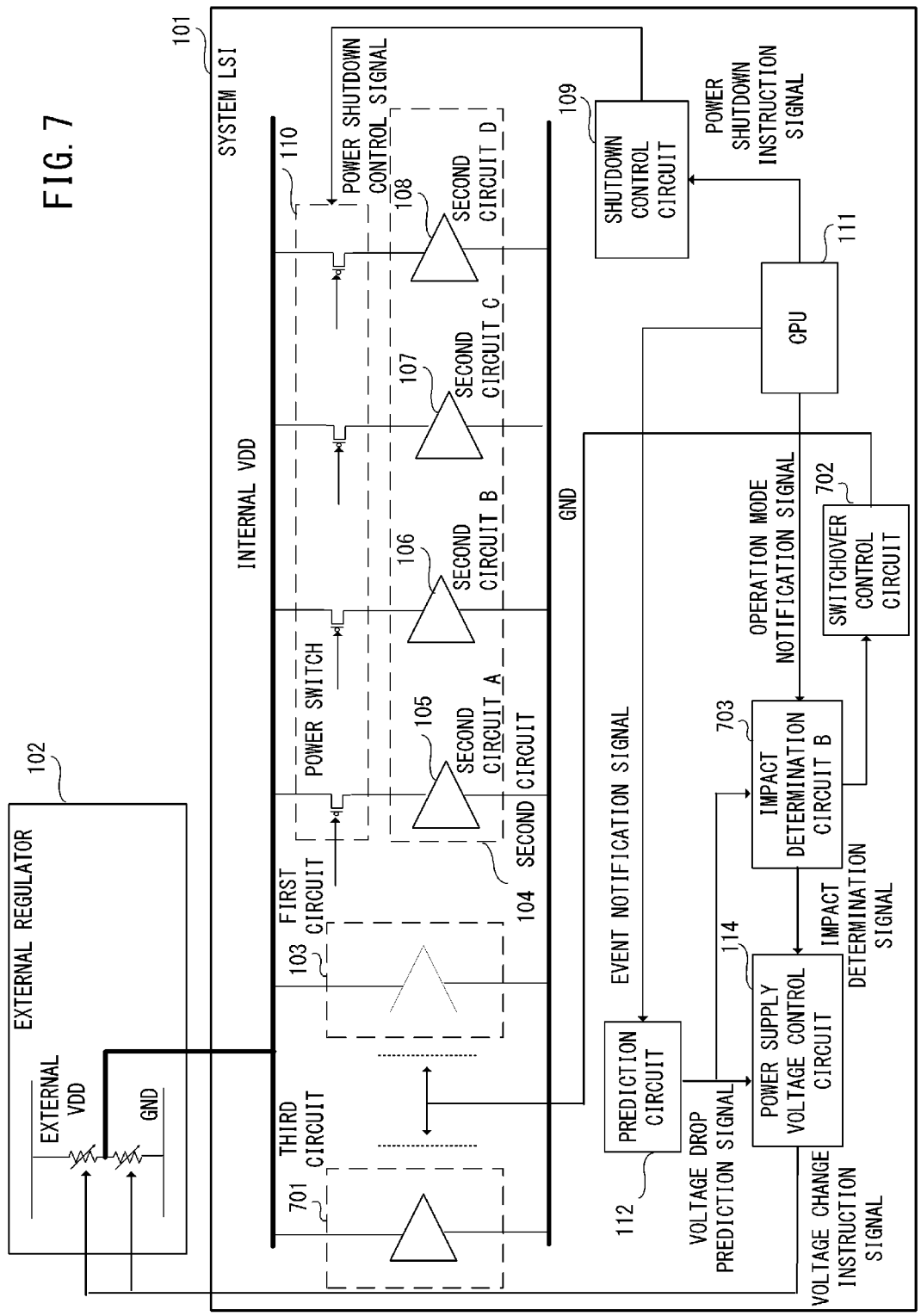
FIG. 7 illustrates a configuration example of a semiconductor integrated circuit according to Embodiment 2.

FIG. 7 illustrates a configuration example of a semiconductor integrated circuit according to the present embodiment. The configuration of Embodiment 2 differs from that of Embodiment 1 in FIG. 1 in that a system LSI 101 includes the third circuit 701 and a switching control circuit 702. In addition, the system LSI 101 includes an impact determination circuit B703 in place of the impact determination circuit 113.

The third circuit 701 has the same configuration as that of the first circuit 103 and is capable of performing the same processing as that performed by the first circuit 103. The third circuit 701 can maintain a normal operation even when a voltage drop occurs in an internal VDD. The third circuit 701 may be connected to a power supply line different from the internal VDD.

In the present embodiment, each of the first circuit 103 and the third circuit 701 has three types of modes: a high resolution mode, a low resolution mode A, and a low resolution mode B. Each operation mode differs in the use of the first circuit 103 and the third circuit 701, which will be described in detail below. In the present embodiment, a value of an operation mode notification signal notified from a CPU 111 to the impact determination circuit B703 represents the "high resolution mode", the "low resolution mode A", or the "low resolution mode B".

When a voltage drop due to an IR drop is expected to occur in the first circuit 103, the impact determination circuit B703 determines the followings. That is, the impact determination circuit B703 determines whether the first circuit 103 is operating, and if the first circuit 103 is operating, the impact determination circuit B703 determines whether switching from the first circuit 103 to the third circuit 701 allows the first circuit 103 to be in a non-operating state.

After the impact determination circuit B703 receives a voltage drop prediction signal from a prediction circuit 112, the impact determination circuit B703 performs any one of the following operations (1) to (3) based on the operation mode notification signal received from the CPU 111 and an internal data table.

(1) When both the first circuit 103 and the third circuit 701 are used, the impact determination circuit B703 determines that the first circuit 103 is affected by the voltage drop. Thus, the impact determination circuit B703 sets the impact determination signal to ON and sets a switching signal to OFF.

(2) When the first circuit 103 is used but the third circuit 701 is not used, the impact determination circuit B703 determines that the third circuit 701 can be substituted for the first circuit 103. Thus, the impact determination circuit B703 sets the impact determination signal to OFF and sets the switching signal to ON.

(3) When the first circuit 103 is not used, the impact determination circuit B703 determines that the first circuit 103 is in an unused state. Thus, the impact determination circuit B703 sets the impact determination signal and the switching signal to OFF.

As described above, even if the first circuit 103 is in the operating state during a voltage drop, if the third circuit 701 can be substituted for the first circuit 103, the impact determination circuit B703 determines that the voltage drop does not affect the operation of the first circuit 103 and sets the impact determination signal to OFF. In this case, the impact determination circuit B703 sets the switching signal to ON. The impact determination circuit B703 transmits the impact determination signal to a power supply voltage control circuit 114 and transmits the switching signal to the switching control circuit 702.

FIG. 8 illustrates an example of contents of the data table in the impact determination circuit B703 of the present embodiment. The data table stores a relationship between the operation mode of the semiconductor integrated circuit of the present embodiment and the operating states of the first circuit 103 and the third circuit 701 when in each operation mode.

In the example in FIG. 8, the first circuit 103 and the third circuit 701 are simultaneously used when in the high resolution mode. Only the first circuit 103 is used and the third circuit 701 is not used when in the low resolution mode A. Only the third circuit 701 is used and the first circuit 103 is not used when in the low resolution mode B. The processing contents of the low resolution mode A and the low resolution mode B are identical but only a different circuit is used.

The low resolution mode A and the low resolution mode B can be switched by using the switching control circuit 702, as will be described below.

When the operation mode is the low resolution mode A and the switching signal transmitted from the impact determination circuit B703 changes from OFF to ON, the switching control circuit 702 performs the following operations. The switching control circuit 702 changes the operation mode from the low resolution mode A to the low resolution mode B, changes the state of the first circuit 103 from the operating state to the non-operating state, and changes the state of the third circuit 701 from the non-operating state to the operating state. The switching control circuit 702 supplies a switching instruction signal to the first circuit 103 and to the third circuit 701, and the above control operations are performed by changing the switching instruction signal from OFF to ON.

Operation Flowchart of Impact Determination Circuit B703

Figure 9:
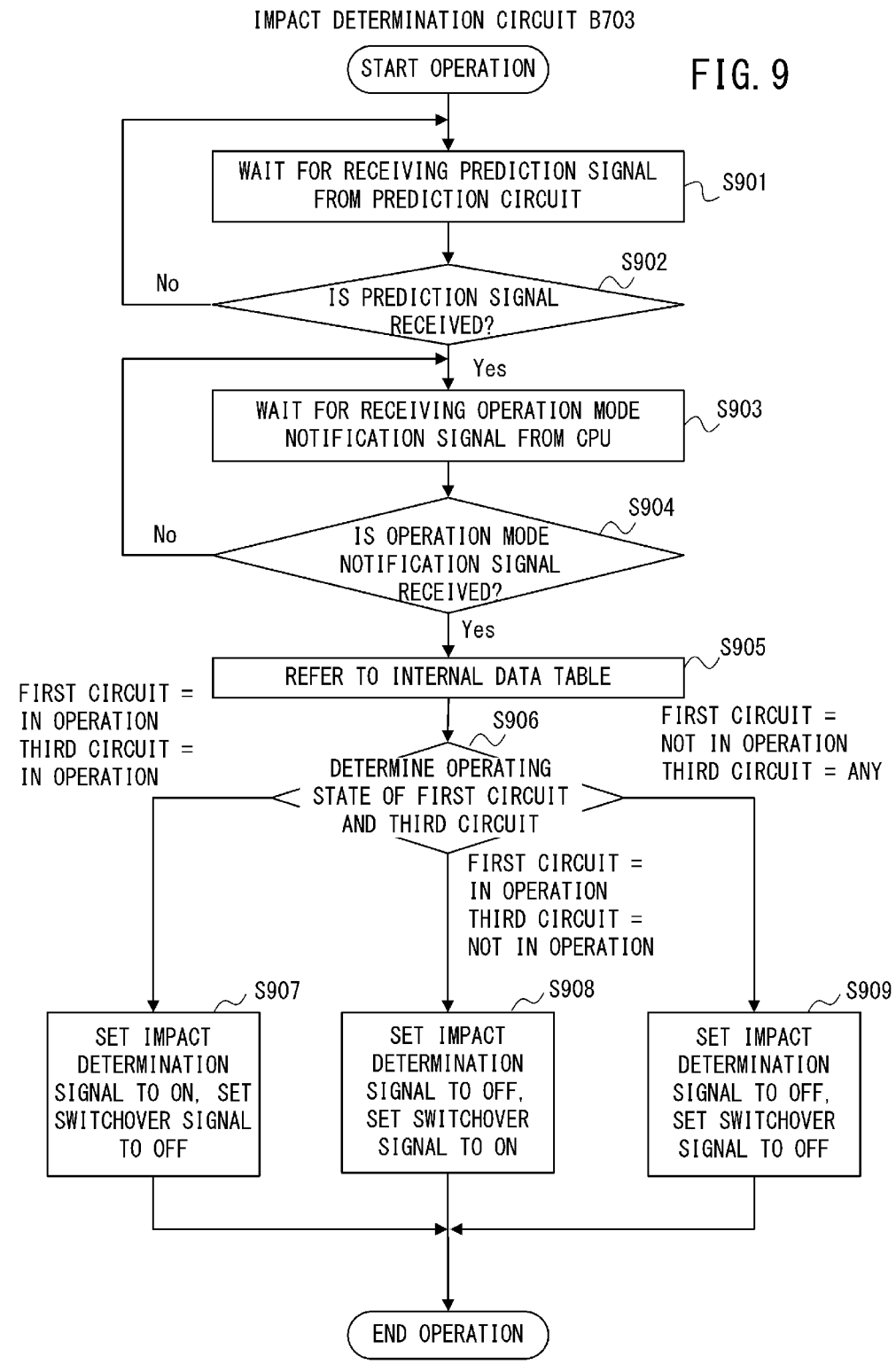
FIG. 9 is a flowchart illustrating an operation of the impact determination circuit B703 according to Embodiment 2.

FIG. 9 is a flowchart illustrating an operation of the impact determination circuit B703 of the present embodiment.

Since the processing contents of steps S901 to S904 in FIG. 9 are identical to those of steps S501 to S504 in FIG. 5 in Embodiment 1, description thereof will be omitted.

In step S905, the impact determination circuit B703 refers to the value of the operation mode notification signal and the internal data table in FIG. 8 and determines the operating states of both the first circuit 103 and the third circuit 701 (S906). More specifically, the impact determination circuit B703 determines whether the first circuit 103 is in an operating state, and if the first circuit 103 is in the operating state, the impact determination circuit B703 determines whether the third circuit 701 can be substituted for the first circuit 103.

When the operation mode is the high resolution mode, since both the first circuit 103 and the third circuit 701 are in the operating state, the impact determination circuit B703 determines that the first circuit 103 is affected by the voltage drop. Thus, the impact determination circuit B703 sets the impact determination signal to ON, and sets the switching signal to OFF (S907).

When the operation mode is the low resolution mode A, since the first circuit 103 is in the operating state and the third circuit 701 is in the non-operating state, the third circuit 701 can be substituted for the first circuit 103, and this switching allows the first circuit 103 to avoid being affected by the voltage drop. Thus, the impact determination circuit B703 sets the impact determination signal to OFF and sets the switching signal to ON (S908).

When the operation mode is the low resolution mode B, since the first circuit 103 is in the non-operating state and the third circuit 701 is in the operating state, the impact determination circuit B703 determines that the first circuit 103 is not affected by the voltage drop. Thus, the impact determination circuit B703 sets the impact determination signal and the switching signal to OFF (S909).

According to the present embodiment, even when the first circuit 103 is in the operating state, if the third circuit 701 is unused, switching is performed from the first circuit 103 to the third circuit 701 so that the third circuit 701 can perform the processing of the first circuit 103. In this way, the normal operation can be maintained without performing voltage correction processing. Avoiding performing unnecessary voltage correction can reduce the power consumption.

Embodiment 3

A configuration of the present embodiment differs only partly from that of Embodiment 1. Therefore, descriptions of the same constituent elements as those in Embodiment 1 will be omitted, and different elements will mainly be described in detail.

In the present embodiment, when a voltage drop is expected to occur while a first circuit 103 is operating, a minimum operating voltage with which no timing violation occurs in the first circuit 103 is estimated based on the frequency, process corner, and temperature of the first circuit 103. Even when the voltage drop occurs, if an internal voltage VDD exceeds the minimum operating voltage, voltage correction is not performed.

Figure 10:
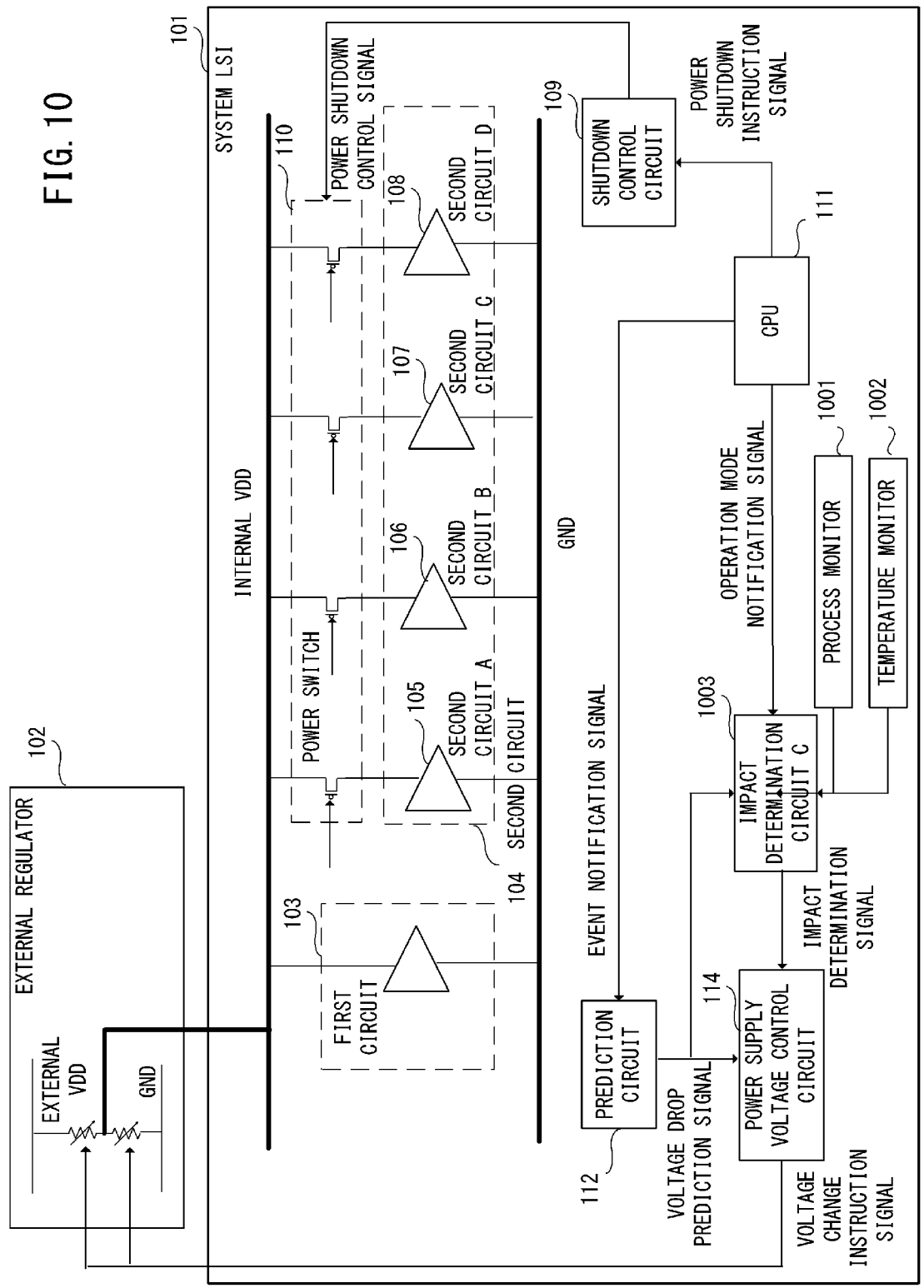
FIG. 10 illustrates a configuration example of a semiconductor integrated circuit according to Embodiment 3.

FIG. 10 illustrates a configuration example of the semiconductor integrated circuit according to Embodiment 3 in FIG. 10. The configuration of Embodiment 3 differs from that of Embodiment 1 in FIG. 1 in that a system LSI 101 includes a process monitor 1001 and a temperature monitor 1002. In addition, the system LSI 101 includes an impact determination circuit C1003 in place of the impact determination circuit 113.

In the present embodiment, the first circuit 103 has two types of modes: a high-speed mode and a low-speed mode. The first circuit 103 operates at 500 MHz when in the high-speed mode and operates at 50 MHz when in the low-speed mode.

In the present embodiment, a value of an operation mode notification signal notified from a CPU 111 to the impact determination circuit C1003 represents the "high-speed mode" or the "low-speed mode".

The process monitor 1001 measures the process corners of the system LSI 101 and transmits this process corner information to the impact determination circuit C1003. The process corners indicate variations in electric characteristics of a semiconductor chip, which is attributed to the manufacturing variations of the semiconductor chip. The process corners are one example of the process information about the chip on which the first circuit is mounted. In the present embodiment, it is assumed that there are three types of corners: Fast, Typical, and Slow.

The temperature monitor 1002 measures the temperature of the first circuit 103 and transmits this temperature information to the impact determination circuit C1003.

The impact determination circuit C1003 determines whether a voltage drop due to the IR drop affects the circuit operation of the first circuit 103. In the present embodiment, when the first circuit 103 is in an operating state during a voltage drop and the power supply voltage after the voltage drop becomes lower than the minimum operating voltage of the first circuit 103, the impact determination circuit C1003 determines that the voltage drop affects the operation of the first circuit 103. The minimum operating voltage of the first circuit 103 can be obtained from an operating frequency, a process corner, and temperature of the first circuit 103 and an internal data table. The operating frequency can be determined from the operation mode. The process corner and the temperature are measured by the process monitor 1001 and the temperature monitor 1002, respectively. If a combination of the current operating frequency, the process corner condition, and the temperature is not defined in the internal data table, the impact determination circuit C1003 obtains the minimum operating voltage by performing interpolation from the contents of the table.

When the internal voltage is lower than the minimum operating voltage, a timing violation occurs in the first circuit 103. For example, values of the minimum operating voltage for various conditions are obtained in advance by conducting STA (Static Timing Analysis) in which timings are statically analyzed using a CAD, and the obtained values can be written in the internal data table.

The impact determination circuit C1003 performs the above determination by using the value of the process corner information transmitted from the process monitor 1001 and the value of the temperature information transmitted from the temperature monitor 1002. In addition, the impact determination circuit C1003 determines that, when the operation mode notification signal represents the high-speed mode, the first circuit 103 operates at 500 MHz and when the operation mode notification signal represents the low-speed mode, the first circuit 103 operates at 50 MHz.

If the voltage value of the first circuit 103 after the voltage drop is below the minimum operating voltage, the impact determination circuit C1003 determines that the voltage drop affects the circuit operation and sets an impact determination signal to ON. If the voltage value of the first circuit 103 after the voltage drop exceeds the minimum operating voltage, the impact determination circuit C1003 determines that the voltage drop does not affect the circuit operation and sets the impact determination signal to OFF. The impact determination circuit C1003 transmits the impact determination signal to the power supply voltage control circuit 114.

When the impact determination signal is ON, the power supply voltage control circuit 114 generates a voltage change instruction signal that instructs to increase the voltage value of the first circuit 103 to a rated voltage value of 1.3 V and transmits the generated voltage change instruction signal to the external voltage regulator 102. However, the voltage value does not necessarily need to be increased to the rated voltage value. The voltage value may be controlled to increase up to at least the minimum operating voltage and not more than the rated voltage of the first circuit 103. In this way, power savings can be achieved while the normal operation is maintained.

FIG. 11 illustrates an example of the contents of the data table in the impact determination circuit C1003 of the present embodiment. The data table stores a relationship between the frequency, process corner, and temperature of the first circuit 103 and the minimum operating voltage of the first circuit 103.

For example, in a case where the frequency is 500 MHz, the process corner is Typical, and the temperature is 80° C., the corresponding minimum operating voltage is 1.17 V. When the power supply to the second circuit C107 is restored, a voltage drop of 0.30 V is expected to occur in the first circuit 103 based on the data table in FIG. 2. Here, the voltage value of the first circuit 103 is 1.30 V−0.30 V=1.00 V, which is lower than the minimum operating voltage of 1.17 V. In this case, the impact determination circuit C1003 determines that the voltage drop affects the circuit operation and sets the impact determination signal to ON.

In the case where the frequency is 50 MHz, the process corner is Typical, and the temperature is 60° C., the minimum operating voltage is 0.90 V. When the power supply to the second circuit C107 is restored, a voltage drop of 0.30 V is expected to occur in the first circuit 103 based on the data table in FIG. 2. Here, the voltage value of the first circuit 103 is 1.30 V−0.30 V=1.00 V, which exceeds the minimum operating voltage of 0.90 V. In this case, the impact determination circuit C1003 determines that the voltage drop does not affect the circuit operation and sets the impact determination signal to OFF.

Operation Flowchart of Impact Determination Circuit C1003

Figure 12:
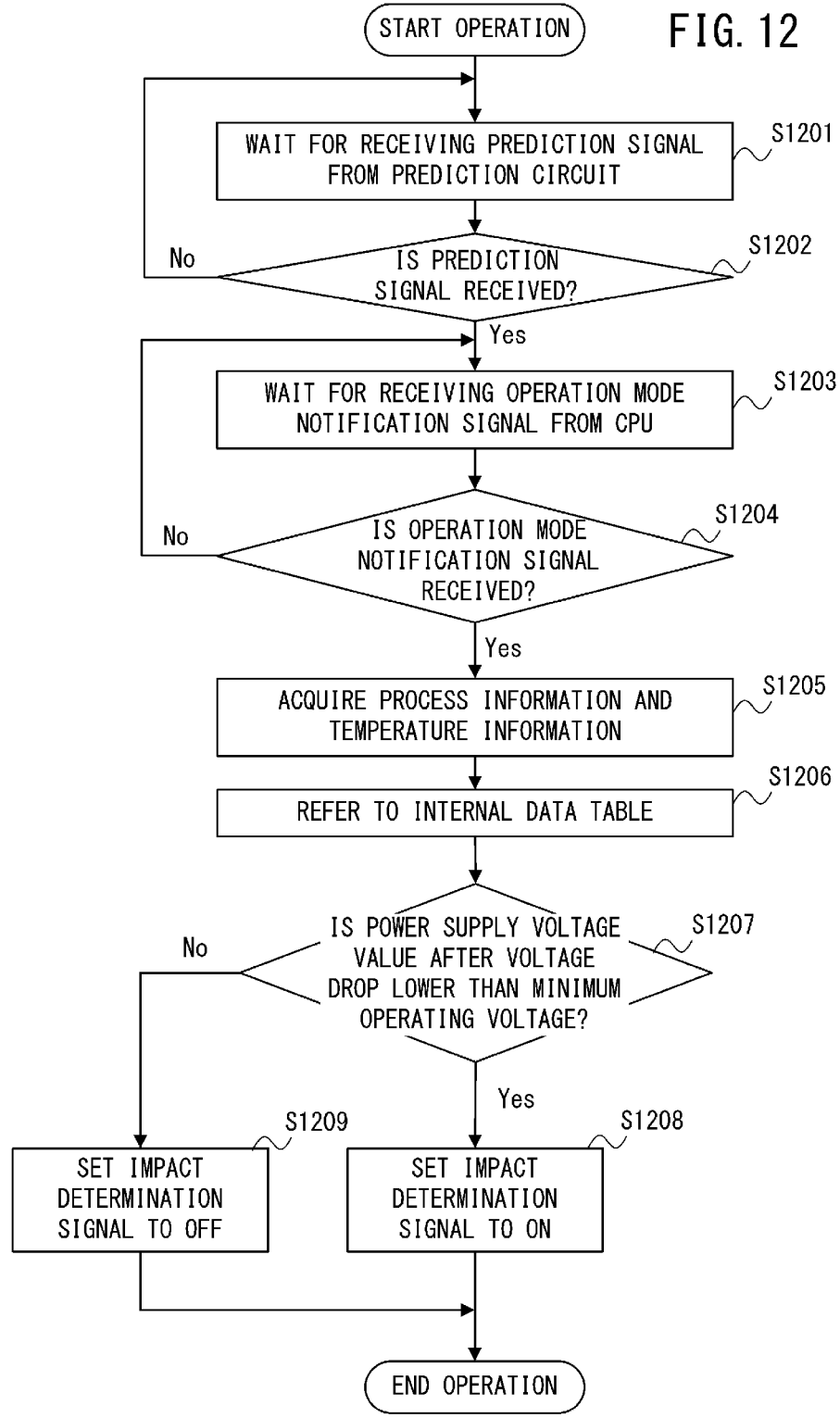
FIG. 12 is a flowchart illustrating an operation of the impact determination circuit C1003 according to Embodiment 3.

FIG. 12 is a flowchart illustrating an operation of the impact determination circuit 1003 of the present embodiment.

First, since the processing contents of steps S1201 to S1204 in FIG. 12 are identical to those of steps S501 to S504 in FIG. 5 in Embodiment 1, description thereof will be omitted.

In step S1205, the impact determination circuit C1003 acquires process corner information and temperature information from the process monitor 1001 and the temperature monitor 1002, respectively. In step S1206, the impact determination circuit C1003 refers to the values of the operation mode notification signal, the processing corner information, and the temperature information and the internal data table in FIG. 11 and performs determination below. The impact determination circuit C1003 obtains the minimum operating voltage of the first circuit 103 from the frequency, the process corner, and the temperature of the first circuit 103 and the internal data table and determines whether the power supply voltage value after the voltage drop is lower than the minimum operating voltage (S1207).

If the impact determination circuit C1003 determines that the power supply voltage value is lower than the minimum operating voltage, the impact determination circuit C1003 sets the impact determination signal to ON (S1208). In contrast, if the impact determination circuit C1003 determines that the power supply voltage value exceeds the minimum operating voltage, the impact determination circuit C1003 sets the impact determination signal to OFF (S1209).

Embodiment 4

A configuration of the present embodiment differs only partly from that of Embodiment 2. Therefore, descriptions of the same constituent elements as those in Embodiment 2 will be omitted, and different elements will mainly be described in detail.

Figure 13:
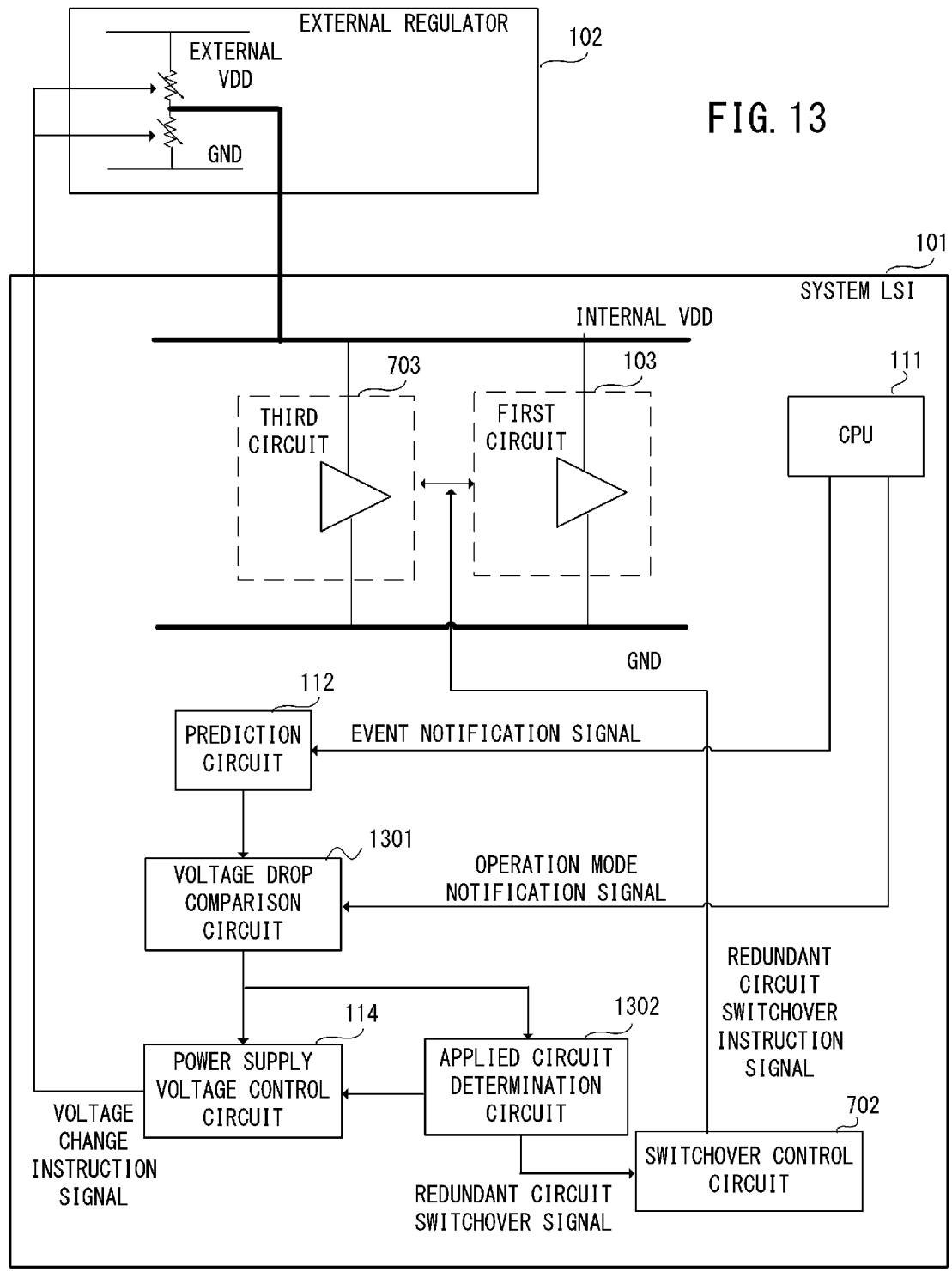
FIG. 13 illustrates a configuration example of a semiconductor integrated circuit according to Embodiment 4.

FIG. 13 illustrates a configuration example of a semiconductor integrated circuit according to Embodiment 4. The present embodiment differs from the configuration of Embodiment 2 illustrated in FIG. 7 in that the system LSI 100 includes a voltage drop comparison circuit 1301 and an applied circuit determination circuit 1302. For the sake of simplification, the second circuit 104, the second circuit A105, the second circuit B106, the second circuit C107, the second circuit D108, the shutdown control circuit 109 and the power switch 110 are omitted in FIG. 13, but the system LSI 101 also includes these elements. In addition, the system LSI 101 includes the circuit B1502, the circuit C1503, the circuit D1505 and the circuit E1506 in FIG. 15 which are not illustrated in FIG. 13. The circuit B1502, the circuit C1503, the circuit D1505 and the circuit E1506 are connected to the respective internal VDD as is the case with the first circuit 103 and the third circuit 701. The first circuit 103, the circuit B1502 and the circuit C1503 are arranged adjacent to the voltage drop occurrence target area 1501 and the third circuit 701, the circuit D1505 and the circuit E1506 are arranged adjacent to the voltage drop occurrence target area 1504.

In the present embodiment, when a voltage drop is predicted while the first circuit 103 is operating, a power supply voltage predicted value in a case where the circuit 103 continues to operate is estimated. Similarly, a power supply voltage predicted value in a case where the first circuit 103 is switched to the third circuit 701 which can be substituted for the first circuit 103 is estimate. And control of the power supply voltage correction is performed such that the power supply voltage predicted value in the case where the first circuit 103 is used and the power supply voltage predicted value in the case where the third circuit 701 is used are compared with each other to switch the circuits such that the voltage correction value required for correcting voltage becomes smaller.

In the present embodiment, the first circuit 103 and the third circuit 701 have four operation modes including operation mode 1, operation mode 2, operation mode 3 and operation mode 4. Although these operation modes are described in details later, the usage of the first circuit 103 and the third circuit 701 and the operating states of circuits arranged around the first circuit 103 and the third circuit 701 are different among these operation modes. In the present embodiment, the values of the operation mode notification signal notified from the CPU 111 to the voltage drop comparison circuit 1301 are "operation mode 1", "operation mode 2", "operation mode 3" and "operation mode 4".

After the voltage drop comparison circuit 1301 receives a voltage drop prediction signal from the prediction circuit 112, the voltage drop comparison circuit 1301 acquires power supply voltage prediction values of the switched circuits according to the operation mode notification signal received from the CPU 111 and the internal data table. In addition, the voltage drop comparison circuit 1301 selects a configuration for which the power supply voltage correction value becomes the smallest based on the plurality of power supply voltage prediction value and transmit the information of the selected configuration to the applied circuit determination circuit 1302. The applied circuit determination circuit 1302 determines which of the first circuit 103 and the third circuit 701 is operated and transmits a redundant circuit switching signal to the redundant circuit switching control circuit (702). The power supply voltage control circuit 114 determines and transmits a voltage increase value for the power supply voltage.

FIG. 14 illustrates the operation modes in Embodiment 4. The table in FIG. 14 indicates which circuit is operated in each operation mode. For example, in operation mode 1 (1401), the functions A, D and E are operated and the functions B and C are not in operation. Similarly, in operation mode 2 (1402), all functions A to E are operated.

FIGS. 15A to 15D illustrate the operating state in each operation mode. In FIGS. 15A to 15D, a circuit without hatching indicates that the circuit is operating and a circuit with hatching indicates that the circuit is not in operation.

FIG. 15A illustrates the state of operation mode 1 in Embodiment 4. In FIG. 15A, the first circuit 103 in the voltage drop occurrence target area 1501 is in operation and the circuit B1502 and the circuit C1503 are not in operation. In addition, the third circuit 701 in the voltage drop occurrence target area 1504 is not in operation and the circuit D1505 and the circuit E1506 are in operation.

The first circuit 103 and the third circuit 701 are functionally equivalent with each other and these circuits can be switched depending on circumstances. The function A is processed by the first circuit 103 or the third circuit 701. In FIGS. 15A to 15D, "A1" indicates the first circuit 103 and "A2" indicates the third circuit 701. The functions B, C and D are processed by the circuits B1502, C1503 and D1504, respectively.

FIG. 15B illustrates a case where the first circuit 103 is used in operation mode 2 in Embodiment 4. When the operation mode is changed from operation mode 1 (1401) to operation mode 2 (1402), the first circuit 103, the circuit D1505 and the circuit E1506 continue to operate. In addition, the circuit B1502 and the circuit 1503 are changed from the non-operating state to the operating state.

FIG. 15C illustrates that the circuit for performing the function A is switched from the first circuit 103 to the third circuit 701 in operation mode 2 in Embodiment 4. Similar to FIG. 15B, when the operation mode is changed from operation mode 1 (1401) to operation mode 2 (1402) in FIG. 15C, the circuit D1505 and the circuit #1506 continue to operate. In addition, the first circuit 103 is being changed to the third circuit 701 which is functionally equivalent to the first circuit 103.

FIG. 15D illustrates a case where the third circuit 701 is used in operation mode 2 in Embodiment 1. As described with reference to FIG. 15C, when the third circuit 701 is changed from the non-operating state to the operating state, the circuit D1505 and the circuit E1506 continue to operate. The first circuit 103 is changed from the operating state to the non-operating state and the third circuit 701 is changed from the non-operating state to the operating state. In addition, the circuit B1502 and the circuit C1503 are changed from the non-operating state to the operating state.

Figure 16A:
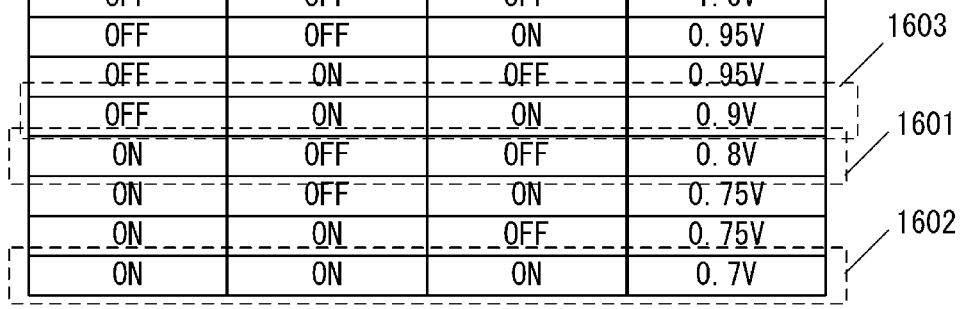
FIGS. 16A and 16B illustrate a power supply voltage prediction table for each area according to Embodiment 4.

FIG. 16A illustrates a power supply voltage prediction table of the voltage drop occurrence target area 1501 in Embodiment 4. The power supply voltage prediction table indicates states of power supply voltage drop in the state in which the circuits arranged around the switched circuit are operating. It is assumed here that the first circuit 103 and the third circuit 701 are switched for performing the function A.

In operation mode 1 in FIG. 15A, the first circuit 103, the circuit B1502 and the circuit C1503 are not in operation in the voltage drop occurrence target area 1501. Therefore, the power supply voltage prediction value of 0.8V in the record 1601 is read from the table.

In operation mode 2 in FIG. 15B, the first circuit 103 continues to operate and the circuit B1502 and the circuit C1503 are changed from the non-operating state to the operating state. Therefore, the power supply voltage prediction value of 0.7V in the record 1602 is read from the table.

On the other hand, in operation mode 2 in FIG. 15D, the first circuit 103 is switched with the third circuit 701. Therefore, the first circuit 103 is in the non-operating state and the circuit B1502 and the circuit C1503 are in the operating state.

Figure 16B:
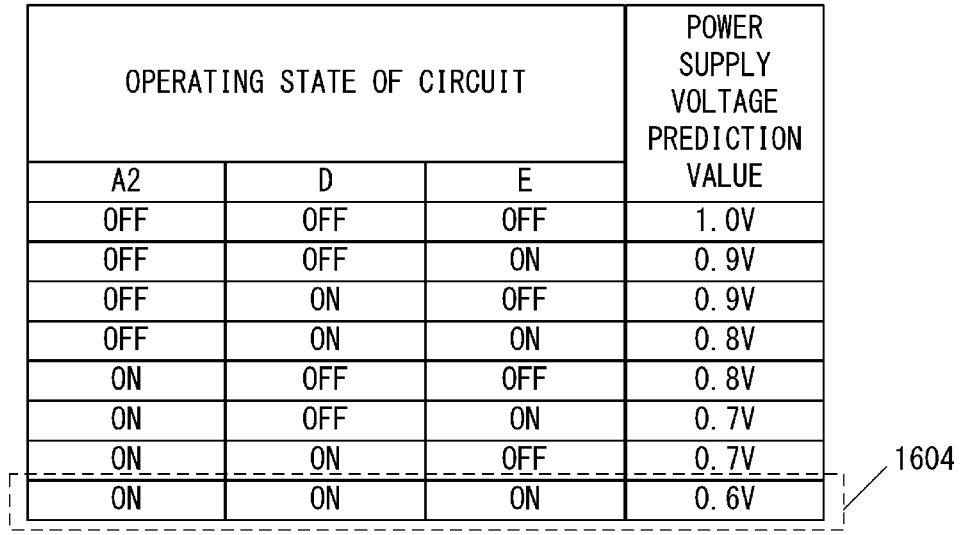

FIG. 16B illustrates a power supply voltage prediction table of the voltage drop occurrence target area 1504 in Embodiment 4. The first circuit 103 is switched with the third circuit 701 in the voltage drop occurrence target area 1504 and the third circuit 701, the circuit D1505 and the circuit E1506 are in the operating state. Therefore, the power supply voltage prediction value of 0.6V in the record 1604 is read from the table.

Thus, in the settings of operation mode 2, the power supply voltage prediction value is 0.7V when the first circuit 103 performs the process of the function A as illustrated in FIG. 15B and the power supply voltage prediction value is 0.6V when the third circuit 701 performs the process of the function A as illustrated in FIG. 15D. In the present embodiment, the configuration in which the third circuit 701 performs the process of the function A is selected, because the voltage correction value for the third circuit 701 is smaller than that for the first circuit 103 when the power supply voltage prediction values for the first circuit 701 and for the third circuit 701 are compared.

It is assumed in the above descriptions that three circuits are included in each of the voltage drop occurrence target areas 1501 and 1504. However, even when more than three circuits are included in the voltage drop occurrence target area, one or more additional table can be used to achieve the technical effects as described above.

Operation Flowchart of Voltage Drop Comparison Circuit 1301

Figure 17:
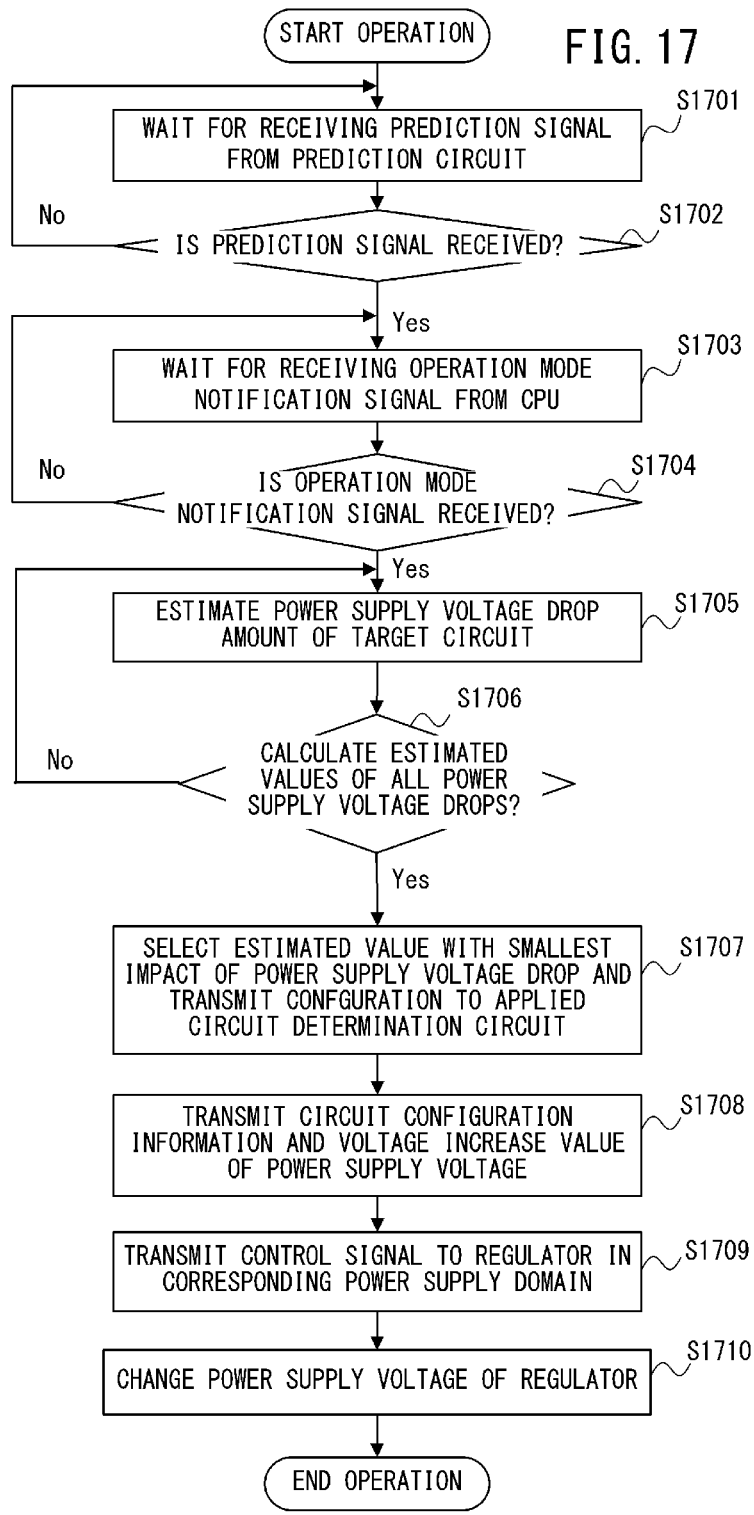
FIG. 17 is a flowchart illustrating an operation of a circuit according to Embodiment 4.

FIG. 17 illustrates an operation flowchart of the voltage drop comparison circuit 1301 in the present embodiment.

Since steps S1701 to S1704 in FIG. 17 are identical to steps S501 to S504 in Embodiment 1 as illustrated in FIG. 5, the descriptions thereof are omitted here.

In step S1705, the voltage drop comparison circuit 1301 refers to the value of the operation mode notification signal and the internal data table as illustrated in FIG. 14 to determine the operating states of the first circuit 103 and the third circuit 701. Specifically, the voltage drop comparison circuit 1301 refers to the power supply voltage prediction table to determine whether the first circuit 103 and the third circuit 701 to be switched, which each is target circuit, are operating or not and the operating states of the circuits arranged around the target circuit, and acquires a power supply voltage prediction value. Since the function A is processed in operation mode 1, operation mode 2 and operation mode 3, the first circuit 103 or the third circuit 701 is to be operated.

When the voltage drop in the case where the first circuit 103 is used is estimated, the voltage drop comparison circuit 1301 refers to the table in FIG. 16A to determine the operating states of the circuits arranged around the first circuit 103 and calculates a power supply voltage prediction value. Then, the process proceeds to step S1706.

In step S1706, the voltage drop comparison circuit 1301 determines whether prediction values of voltage drop have been estimated for all possible circuit states. When a prediction value has not been estimated for a possible circuit state, the voltage drop comparison circuit 1301 returns the process to step S1705 to calculate a power supply voltage prediction value for the possible circuit state. In the present example, since it is possible to use the third circuit 701, the voltage drop comparison circuit 1301 calculates a power supply voltage prediction value in the case where the third circuit 701 is used. When power supply voltage prediction values for all possible circuits have been calculated, the process proceeds to step S1707.

Although it is assumed in the above descriptions that the first circuit 103 is switched to only the third circuit 701, another circuit or other circuits can be switched from the first circuit 103. In such a case, when power supply voltage prediction values for the other circuit(s) have been calculated, the process proceeds to step S1707.

In step S1707, the voltage drop comparison circuit 1301 selects based on the plurality of power supply voltage prediction values the configuration in which the correction value of the power supply voltage is the smallest and transmits the circuit information of the selected configuration to the applied circuit determination circuit 1302. The circuit information of the selected configuration includes information indicating which circuit is used.

In step S1708, the applied circuit determination circuit 1302 selects the first circuit 103 or the third circuit 701 based on the information transmitted from the voltage drop comparison circuit 1301 indicating the configuration in which the power supply voltage prediction value is the smallest. Based on an instruction from the CPU 111, the applied circuit determination circuit 1302 transmits the selected circuit information as a redundant circuit switching signal to the redundant circuit switching control circuit 702. The redundant circuit switching control circuit 702 generates a redundant circuit switching instruction signal for switching between the first circuit 103 and the third circuit 701.

In addition, the voltage drop comparison circuit 1301 determines a voltage increase value of the power supply voltage for which the voltage drop prediction value is the smallest, and notifies the power supply voltage control circuit 114 of the determined voltage increase value. In the case as described above, the voltage increase value of the power supply voltage for which the voltage drop prediction value is the smallest corresponds to the power supply voltage prediction value of 0.7V when the first circuit 103 is operated. Therefore, the voltage drop comparison circuit 1301 notifies the power supply voltage control circuit (114) of the voltage increase value for achieving the minimum voltage to ensure the normal operation of the circuit. Similar to step S1205 in FIG. 12, the voltage increase value can be calculated based on the operation mode notification signal, process corner information and the temperature information and the like. In the case as described above, since the power supply voltage prediction value is 0.7V, the power supply voltage should be increased by 0.1V when the minimum operating voltage is 0.8V.

In step S1709, the power supply voltage control circuit 114 notifies the external voltage regulator 102 in the corresponding power supply domain of the notified voltage increase value of the power supply voltage.

In step S1710, the external voltage regulator 102 controls the voltage value of the internal power supply VDD based on the notified voltage change instruction signal.

In the present embodiment as described above, when it is estimated that voltage drop occurs while the first circuit 103 is operating, the power supply voltage prediction values of the first circuit 103 and the third circuit 701 to be switched are estimated based on the operating states of the circuits arranged around the first circuit 103 and the third circuit 701, respectively. Thus, the voltage correction value required for voltage correction can be smaller by comparing the power supply voltage prediction values of the first circuit 103 and the third circuit 701 with each other. As a result, the power consumption can be reduced.

In the above descriptions, it is assumed that there is a single power supply domain. However, even when the voltage drop occurrence target circuits are configured in two or more power supply domains, the technique as described above can be used to control the power supply voltage.

FIG. 18 illustrates a configuration example of semiconductor integrated circuits in a plurality of power supply domains. The configuration in FIG. 18 differs from the configuration in FIG. 13 in that voltage drop occurrence target circuits are configured in difference power supply domains and the power supply voltage control circuit 114 transmits control signals to a plurality of external regulators for control a plurality of power supply voltages.

Two power supply domains 1802 and 1806 are provided for LSI 101, and the first power supply domain 1806 is provided for the area including the first circuit 103 and the second power supply domain 1802 is provided for the area including the fourth circuit 1801.

The fourth circuit 1801 is functionally equivalent to the first circuit 103.

As described above, the voltage drop comparison circuit 1301 determines the operating states of the first circuit 103, the fourth circuit 1801 and the circuits arranged around the target circuits to calculate a voltage increase value of the power supply voltage. The power supply voltage control circuit 114 provides a control signal to the external voltage regulator 102 to provide the internal power supply VDD for the first power supply domain 1806. Similarly, the power supply voltage control circuit 114 provides a control signal to the other external voltage regulator 1803 to provide the internal power supply VDD2 for the second power supply domain 1802.

Accordingly, even when the voltage drop occurrence target circuits are configured in a plurality of power supply domains, the technique as described above can be used to control the power supply voltage and reduce the power consumption.

Further, an AVS (Adaptive Voltage Scaling) function can be applied to the control of power supply voltages in the power supply domains in the above embodiments. The AVS function is a technique for monitoring the operation conditions of the configured circuits and providing optimal voltage for the circuits according to the process variations and the changes of the operation conditions in order to reduce the power consumption. In the circuit with the AVS function applied, the operation conditions of the configured circuits are monitors and the voltage values are decreased according to the process variations and the changes of the operation conditions in order to provide the optimal voltage for the circuits. In this case, a voltage value obtained by adding, to the voltage decrease value upon application of the AVS function, the voltage increase value for achieving that the operating voltage becomes equal to or larger than the minimum operating voltage according to the operating states of the switching circuit and the circuits arranged around the switching circuit is transmitted to the external regulator as a voltage change instruction signal.

According to the above configurations, when the AVS function is employed, the voltage correction value required for voltage correction can be controlled to become smaller according to the operation conditions of the circuits arranged around the switching circuit in addition to the voltage control according to the process variations. Again, the power consumption can be reduced.

According to the present disclosure, when a voltage drop occurs, voltage correction is performed only when the voltage drop affects the circuit operation. This reduces unnecessary power supply voltage correction so that the power consumption for the voltage correction can be reduced.

Other Embodiments

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-066957, filed on Apr. 2, 2020, and Japanese Patent Application No. 2021-018097, filed on Feb. 8, 2021, which are hereby incorporated by reference herein in their entirety.

What is claimed is:

1. A semiconductor integrated circuit comprising:
    a first circuit connected to a power supply line;
    a prediction circuit configured to predict whether a voltage drop occurs;
    a determination circuit configured to determine whether the voltage drop in the power supply line affects an operation of the first circuit, in response to the prediction that the voltage drop occurs;
    a power supply voltage control circuit configured to control change of a power supply voltage value on the basis of a determination result of the determination;
    a third circuit capable of performing the operation of the first circuit; and
    a comparison circuit configured to determine which of the first circuit and the third circuit is operated based on comparison between a prediction value of a power supply voltage value for the first circuit when the first circuit is operated and a prediction value of a power supply voltage value for the third circuit when the third circuit is operated,
    wherein the power supply voltage control circuit transmits, to a voltage regulator that supplies a power supply voltage to the power supply line, a voltage change instruction signal that instructs to increase a voltage value during a period for which occurrence of the voltage drop is predicted, and
    wherein the prediction circuit predicts at least any of a voltage drop value, a voltage drop start time, and a voltage drop end time.

2. The semiconductor integrated circuit according to claim 1, further comprising an instruction circuit configured to transmit an instruction signal to restore power supply to a second circuit connected to the power supply line, and to transmit a first notification signal to the prediction circuit when transmitting the instruction signal, wherein the prediction circuit predicts occurrence of the voltage drop in response to receiving the first notification signal.

3. The semiconductor integrated circuit according to claim 2, further comprising a plurality of the second circuits, wherein
    the first notification signal indicates one of the plurality of second circuits to which power is restored, and
    the prediction circuit includes a table that stores at least any of a voltage drop value generated upon power supply restoration, a voltage drop start time generated upon power supply restoration, and a voltage drop end time generated upon power supply restoration for each of the second circuits and predicts at least any of the voltage drop value generated upon power supply restoration, the voltage drop start time generated upon power supply restoration, and the voltage drop end time generated upon power supply restoration on the basis of the one second circuit to which power is restored, which is indicated in the first notification signal, and the table.

4. The semiconductor integrated circuit according to claim 1, further comprising a monitoring circuit configured to monitor change in the power supply voltage, wherein the determination circuit performs the determination when the voltage drop is detected by the monitoring circuit.

5. The semiconductor integrated circuit according to claim 1, wherein, when the first circuit is in an operating state during the period of occurrence of the voltage drop, the determination circuit determines that the voltage drop affects the operation of the first circuit.

6. The semiconductor integrated circuit according to claim 5, wherein the determination circuit has a table that stores a relationship between an operation mode and whether the first circuit is in the operating state and determines whether the voltage drop affects the operation of the first circuit on the basis of a second notification signal indicating a current operation mode and the table.

7. The semiconductor integrated circuit according to claim 1, wherein, even when the first circuit is in an operating state during the period of occurrence of the voltage drop, the determination circuit determines that the voltage drop does not affect the operation of the first circuit when the third circuit is capable of performing the operation of the first circuit when substituted for the first circuit.

8. The semiconductor integrated circuit according to claim 7, wherein the determination circuit has a table that stores a relationship between an operation mode and whether each of the first circuit and the third circuit is in the operating state, determines whether the first circuit and the third circuit are in the operating state on the basis of a signal indicating a current operation mode and the table, and determines that the voltage drop affects the operation of the first circuit when both the first circuit and the third circuit are in the operating state.

9. The semiconductor integrated circuit according to claim 7, further comprising a switching circuit configured to switch the first circuit to a non-operating state and switch the third circuit to the operating state when the first circuit is in the operating state and the third circuit is in the non-operating state during the period of occurrence of the voltage drop.

10. The semiconductor integrated circuit according to claim 1, wherein the determination circuit determines that the voltage drop affects the operation of the first circuit when the first circuit is in an operating state during the period of occurrence of the voltage drop and the power supply voltage after the voltage drop is lower than a minimum operating voltage of the first circuit.

11. The semiconductor integrated circuit according to claim 10, wherein the determination circuit obtains the minimum operating voltage of the first circuit on the basis of at least any of an operating frequency of the first circuit, process information about a chip on which the first circuit is mounted, and temperature information about the first circuit.

12. The semiconductor integrated circuit according to claim 1, wherein the power supply voltage control circuit transmits, to the voltage regulator that supplies the power supply voltage to the power supply line, the voltage change instruction signal that instructs to increase, during the period for which occurrence of the voltage drop is predicted, the voltage value by an amount of the voltage drop.

13. The semiconductor integrated circuit according to claim 10, wherein the power supply voltage control circuit transmits, to the voltage regulator that supplies the power supply voltage to the power supply line, the voltage change instruction signal that instructs to increase, during the period for which occurrence of the voltage drop is predicted, the voltage value such that the power supply voltage is at least the minimum operating voltage of the first circuit.

14. The semiconductor integrated circuit according to claim 1, wherein the comparison circuit predicts the power supply voltage value for the first circuit when the first circuit is operated based on an operating state of a circuit arranged adjacent to an area in which the first circuit is arranged and predicts the power supply voltage value for the third circuit when the third circuit is operated based on an operating state of a circuit arranged adjacent to an area in which the third circuit is arranged.

15. The semiconductor integrated circuit according to claim 1, wherein the comparison circuit determines which of the first circuit and the third circuit is operated such that a correction value of the power supply voltage becomes the smallest.

16. The semiconductor integrated circuit according to claim 1, further comprising:
a switching circuit configured to set the first circuit to an operating state and the third circuit to a non-operating state when the comparison circuit determines that the first circuit is operated during the period of occurrence of the voltage drop and configured to set the first circuit to the non-operating state and the third circuit to the operating state when the comparison circuit determines that the third circuit is operated during the period of occurrence of the voltage drop.

17. The semiconductor integrated circuit according to claim 1, wherein
the voltage change instruction signal instructs the voltage regulator to increase the voltage value such that the power supply voltage becomes equal to or larger than a minimum operating voltage of the first circuit when the comparison circuit determines that the first circuit is operated, and to increase the voltage value such that the power supply voltage becomes equal to or larger than a minimum operating voltage of the third circuit when the comparison circuit determines that the third circuit is operated.

18. The semiconductor integrated circuit according to claim 17, wherein
the power supply voltage control circuit has a function for controlling voltage according to a change of an operation condition, and
the power supply voltage control circuit transmits to the voltage regulator the voltage value as the voltage change instruction signal, the voltage value obtained by adding a voltage increase value to a voltage value decreased by the function, the addition achieving an operating voltage of the first circuit that is equal to or larger than the minimum operating voltage of the first circuit when the first circuit is operated, or an operating voltage of the third circuit that is equal to or larger than the minimum operating voltage of the third circuit when the third circuit is operated.

19. A power supply voltage control method for a semiconductor integrated circuit including a first circuit connected to a power supply line and a third circuit capable of performing operation of the first circuit, the power supply voltage control method comprising:
predicting whether a voltage drop occurs in the power supply line;
determining whether the voltage drop in the power supply line affects the operation of the first circuit, in response to the prediction that the voltage drop occurs;
controlling change of a power supply voltage value based on a determination by the determining,
determining which of the first circuit and the third circuit is operated based on comparison between a prediction value of a power supply voltage value for the first circuit when the first circuit is operated and a prediction value of a power supply voltage value for the third circuit when the third circuit is operated,
wherein controlling the change of the power supply voltage value comprises transmitting, to a voltage regulator that supplies a power supply voltage to the power supply line, a voltage change instruction signal that instructs to increase a voltage value during a period for which occurrence of the voltage drop is predicted, and wherein predicting whether the voltage drop occurs comprises predicting at least any of a voltage drop value, a voltage drop start time, and a voltage drop end time.

20. A semiconductor integrated circuit comprising:

a first circuit connected to a power supply line;

a prediction circuit configured to predict whether a voltage drop occurs;

a determination circuit configured to determine whether the voltage drop in the power supply line affects an operation of the first circuit, in response to the prediction that the voltage drop occurs;

a power supply voltage control circuit configured to control change of a power supply voltage value on the basis of a determination result of the determination; and an instruction circuit configured to transmit an instruction signal to restore power supply to a second circuit connected to the power supply line, and to transmit a first notification signal to the prediction circuit when transmitting the instruction signal, wherein the prediction circuit predicts occurrence of the voltage drop in response to receiving the first notification signal, wherein the power supply voltage control circuit transmits, to a voltage regulator that supplies a power supply voltage to the power supply line, a voltage change instruction signal that instructs to increase a voltage value during a period for which occurrence of the voltage drop is predicted, and wherein the prediction circuit predicts at least any of a voltage drop value, a voltage drop start time, and a voltage drop end time.

21. A semiconductor integrated circuit comprising:

a first circuit connected to a power supply line;

a prediction circuit configured to predict whether a voltage drop occurs;

a determination circuit configured to determine whether the voltage drop in the power supply line affects an operation of the first circuit, in response to the prediction that the voltage drop occurs; and a power supply voltage control circuit configured to control change of a power supply voltage value on the basis of a determination result of the determination, wherein the power supply voltage control circuit transmits, to a voltage regulator that supplies a power supply voltage to the power supply line, a voltage change instruction signal that instructs to increase a voltage value during a period for which occurrence of the voltage drop is predicted, wherein the prediction circuit predicts at least any of a voltage drop value, a voltage drop start time, and a voltage drop end time, and wherein, even when the first circuit is in an operating state during the period of occurrence of the voltage drop, the determination circuit determines that the voltage drop does not affect the operation of the first circuit when a third circuit capable of performing the operation of the first circuit is substituted for the first circuit.

* * * * *